(12) United States Patent
Miyata et al.

(10) Patent No.: US 10,773,981 B2
(45) Date of Patent: Sep. 15, 2020

(54) SEWAGE TREATMENT SYSTEM HAVING A TRICKLING FILTER WITH WASH UNIT

(71) Applicant: METAWATER CO., LTD., Tokyo (JP)

(72) Inventors: Atsushi Miyata, Tokyo (JP); Shigeki Takeda, Tokyo (JP); Tetsutarou Kuruma, Tokyo (JP)

(73) Assignee: Metawater Co., Ltd., Tokyo (JP)

( * ) Notice: Subject to any disclaimer, the term of this patent is extended or adjusted under 35 U.S.C. 154(b) by 536 days.

(21) Appl. No.: 14/088,785

(22) Filed: Nov. 25, 2013

(65) Prior Publication Data

US 2014/0076788 A1 Mar. 20, 2014

Related U.S. Application Data

(63) Continuation of application No. PCT/JP2012/063649, filed on May 28, 2012.

(30) Foreign Application Priority Data

May 26, 2011 (JP) .................................. 2011-118401

(51) Int. Cl.
*C02F 3/04* (2006.01)
*B01D 29/66* (2006.01)
(Continued)

(52) U.S. Cl.
CPC ................ *C02F 3/04* (2013.01); *B01D 29/66* (2013.01); *C02F 3/006* (2013.01); *C02F 3/043* (2013.01);
(Continued)

(58) Field of Classification Search
CPC ...... C02F 1/58; C02F 3/00; C02F 3/04; C02F 3/043; C02F 3/06; C02F 3/08;
(Continued)

(56) References Cited

U.S. PATENT DOCUMENTS 2,355,640 A * 8/1944 Fischer .................. B01D 21/00
210/151
3,563,888 A * 2/1971 Klock ...................... C02F 3/06
210/150
(Continued)

FOREIGN PATENT DOCUMENTS

GB 1487917 A * 10/1977 ............ C02F 3/1284
JP 56-147686 A1 11/1981
(Continued)

OTHER PUBLICATIONS

International Search Report and Written Opinion (Application No. PCT/JP2012/063649) dated Jun. 26, 2012.

*Primary Examiner* — Robert Clemente
*Assistant Examiner* — Akash K Varma
(74) *Attorney, Agent, or Firm* — Burr & Brown, PLLC

(57) ABSTRACT

A sewage treatment system, includes a solid-liquid separating apparatus having a first filtering medium packed layer packed with a predetermined filtering medium, configured to separate sewage to be treated into solid components and filtered water by passing the sewage through the first filtering medium packed layer upward, and configured to reversely wash the first filtering medium packed layer by passing the filtered water through the first filtering medium packed layer downward at a predetermining timing; and a trickling filter installed on a latter stage of the solid-liquid separating apparatus, having a second filtering medium packed layer packed with a filtering medium attached with microorganisms, and configured to allow the filtered water to fall into the second filtering medium packed layer by trickling the filtered water onto an upper part of the second filtering medium packed layer to flow out treated water acquired by biotreating the filtered water by the microorganisms.

9 Claims, 10 Drawing Sheets

(51) Int. Cl.
*C02F 3/06* (2006.01)
*C02F 3/08* (2006.01)
*C02F 3/00* (2006.01)
*C02F 3/10* (2006.01)

(52) U.S. Cl.
CPC ................ *C02F 3/06* (2013.01); *C02F 3/085* (2013.01); *C02F 3/105* (2013.01); *C02F 2209/001* (2013.01); *C02F 2209/44* (2013.01); *C02F 2303/16* (2013.01); *Y02W 10/15* (2015.05)

(58) Field of Classification Search
CPC .. C02F 3/082; C02F 3/085; C02F 3/10; C02F 3/12; C02F 3/1205; C02F 3/1236; C02F 3/1278; C02F 3/14; C02F 3/20; C02F 3/22; C02F 3/223; C02F 3/226; C02F 3/24; C02F 3/26; C02F 3/28; C02F 3/30; C02F 3/34; C02F 2003/001; C02F 9/00; C02F 3/006; C02F 3/105; C02F 2209/001; C02F 2209/44; C02F 2303/16; B01D 29/66; Y02W 10/15

USPC .................................................. 210/138, 151
See application file for complete search history.

(56) References Cited

U.S. PATENT DOCUMENTS

| | | | | |
|---|---|---|---|---|
| 3,730,881 | A | * | 5/1973 | Armstrong .............. A61L 2/202 210/195.3 |
| 6,170,216 | B1 | * | 1/2001 | Rye ..................... B29C 45/2628 52/656.8 |

FOREIGN PATENT DOCUMENTS

| | | |
|---|---|---|
| JP | 01-139194 A1 | 5/1989 |
| JP | 10-244281 A1 | 9/1998 |
| JP | 99/42408 A1 | 8/1999 |
| JP | 2000-005779 A1 | 1/2000 |
| JP | 2006-239536 A1 | 9/2006 |
| JP | 2007-175686 A1 | 7/2007 |
| JP | 2011-092862 A1 | 5/2011 |

* cited by examiner

SEWAGE TREATMENT SYSTEM HAVING A TRICKLING FILTER WITH WASH UNIT

CROSS-REFERENCE TO RELATED APPLICATION

This application is a continuation of PCT International Application No. PCT/JP2012/063649 filed on May 28, 2012 which claims the benefit of priority from Japanese Patent Application No. 2011-118401 filed on May 26, 2011, the entire contents of which are incorporated herein by reference.

BACKGROUND OF THE INVENTION

1. Field of the Invention

The present invention relates to a sewage treatment system that treats sewage.

2. Description of the Related Art

In the related art, as a sewage treatment system that treats sewage such as living drainage water or factory drainage water, various sewage treatment systems have been put to practical use, such as a system by a standard activated sludge method, a system by an anaerobic lagoon method, or a system by a trickling filter method.

In the sewage treatment system by the standard activated sludge method, an aeration treatment is performed, which supplies oxygen to a large variety of aerobic microorganisms that are present in a reaction tank while sewage to be treated is introduced into the reaction tank. As a result, organic materials included in the sewage of the reaction tank are decomposed by actions of the aerobic microorganisms to thereby acquire stable treated water quality.

However, in the sewage treatment system by the standard activated sludge method, since a lot of power is consumed for the aeration treatment, an electric bill for the sewage treatment is high. Further, much cost is required to treat sludge which is generated during the sewage treatment. As a result, in the sewage treatment system by the standard activated sludge method, a running cost in the sewage treatment is expensive as compared with other methods.

Further, in the standard activated sludge method, sludge in a precipitation basin is difficult to precipitate, and as a result, a bulking phenomenon in which sludge, and the like leak from the precipitation basin occurs. Therefore, the sewage treatment system by the standard activated sludge method has demerits in that a special knowledge is required for maintenance of the sewage treatment system by the standard activated sludge method.

Meanwhile, in the sewage treatment system by the anaerobic lagoon method, the sewage is introduced into lagoon with anaerobic microorganisms and the sewage is purified by actions of the anaerobic microorganisms in the lagoon. In this case, the sewage treatment system can be easily maintained and the sewage can be treated with low power consumption.

However, in the sewage treatment system by the anaerobic lagoon method, since it is difficult to reduce a biochemical oxygen demand (BOD) of the sewage to be treated, rivers or sea may be contaminated. Since the sludge generated in the lagoon may not be extracted, the sludge is deposited in the lagoon, and as a result, a reduction rate of the BOD further deteriorates. When the sludge is excessively deposited, a sewage treatment capability in the lagoon deteriorates and finally, the sewage may not be treated in the same lagoon.

By considering the demerits of the sewage treatment system by the standard activated sludge method or the anaerobic lagoon method, the sewage treatment system by the trickling filter method has been reevaluated in recent years. The sewage treatment system by the trickling filter method generally has a configuration illustrated in FIG. 13.

That is, a sewage treatment system 100 by the trickling filter method includes a first precipitation basin 101, a trickling filter 102, and a final precipitation basin 103, as illustrated in FIG. 13. In the first precipitation basin 101, the sewage to be treated is gently introduced and a solid material such as garbage included in the sewage is precipitated. Thereafter, supernatant water of the precipitated sewage flows from the first precipitation basin 101 to the trickling filter 102 as separator water from which the solid material is separated.

The trickling filter 102 has a filtering medium layer in which filtering media such as broken stone are deposited in a layered shape and attaches microorganisms to the surface of each filtering medium of the filtering medium layer. The separator water introduced from the first precipitation basin 101 is sprayed to the filtering medium layer of the trickling filter 102 from the top and flows down to the bottom of the trickling filter 102 while passing through voids of the filtering medium layer. On this occasion, the flow (rise or drop) of gas in the voids is caused by using a difference in height of temperature between each filtering medium and the separator water in the filtering medium layer, and as a result, the filtering medium layer is ventilated. The organic materials in the separator water that flows down in the filtering medium layer are decomposed by the microorganisms on the surface of each filtering medium. The decomposed treated water flows from the trickling filter 102 to the final precipitation basin 103.

In the final precipitation basin 103, the treated water is introduced from the trickling filter 102 and the solid material included in the treated water is precipitated. Thereafter, the supernatant water of the precipitated treated water is discharged from the final precipitation basin 103 as the treated water.

Incidentally, another example of the trickling filter 102 includes an anaerobic trickling filter in which water-absorptive fibers for retaining sludge is placed within a basin under an oxygen-free atmosphere along a stereoscopic netlike core, a synthetic fiber made plane member having a net hole size of 5 to 30 mm is packed, a raw water trickling unit is provided on the top, the treated water flows down in the member in a liquid film shape and is subjected to methane fermentation and thereafter, the treated water leaks from the bottom of the treatment basin (see Japanese Patent Application Laid-open No. 2007-175686). Also, there is a trickling filter type drain treatment apparatus that has an anaerobic unit on the top in the same treatment basin and an aerobic unit on the bottom, and allows biological reaction to be performed in both the anaerobic unit and the aerobic unit (see Japanese Patent Application Laid-open No. 2011-092862).

However, in the sewage treatment system by the trickling filter method in the related art, since the first precipitation basin is at least required at a former stage of the trickling filter, an installation space of the entire system is enlarged. Also, since the concentration of suspended solids (SS) of sewage to be treated, which are introduced into the trickling filter from the first precipitation basin, is high, a trickling nozzle is often clogged.

Further, in the first precipitation basin at the former stage of the trickling filter, fine SS or solid BOD of the sewage to be treated is not sufficiently removed, and as a result, garbage including solids, and the like which may not be fully separated from the first precipitation basin is retained in the filtering medium layer of the trickling filter and bad smell occurs due to corruption of the retained garbage or filtering flies are caused due to the retained garbage.

For the foregoing reasons, there is a need for a sewage treatment system that can suppress the occurrence of the bad smell and the filtering flies from the trickling filter, prevent the trickling nozzle from being clogged, and save a space for installing the system.

SUMMARY OF THE INVENTION

A sewage treatment system according to the present invention includes a solid-liquid separating apparatus having a first filtering medium packed layer packed with a predetermined filtering medium, configured to separate sewage to be treated into solid components and filtered water by passing the sewage through the first filtering medium packed layer upward, and configured to reversely wash the first filtering medium packed layer by passing the filtered water through the first filtering medium packed layer downward at a predetermining timing; and a trickling filter installed on a latter stage of the solid-liquid separating apparatus, having a second filtering medium packed layer packed with a filtering medium attached with microorganisms, and configured to allow the filtered water to fall into the second filtering medium packed layer by trickling the filtered water onto an upper part of the second filtering medium packed layer to flow out treated water acquired by biotreating the filtered water by the microorganisms.

The above and other features, advantages and technical and industrial significance of this invention will be better understood by reading the following detailed description of presently preferred embodiments of the invention, when considered in connection with the accompanying drawings.

DETAILED DESCRIPTION OF THE INVENTION

Hereinafter, exemplary embodiments of a sewage treatment system according to the present invention will be described in detail with reference to the accompanying drawings. The present invention is not limited to the embodiments.

Figure 1:
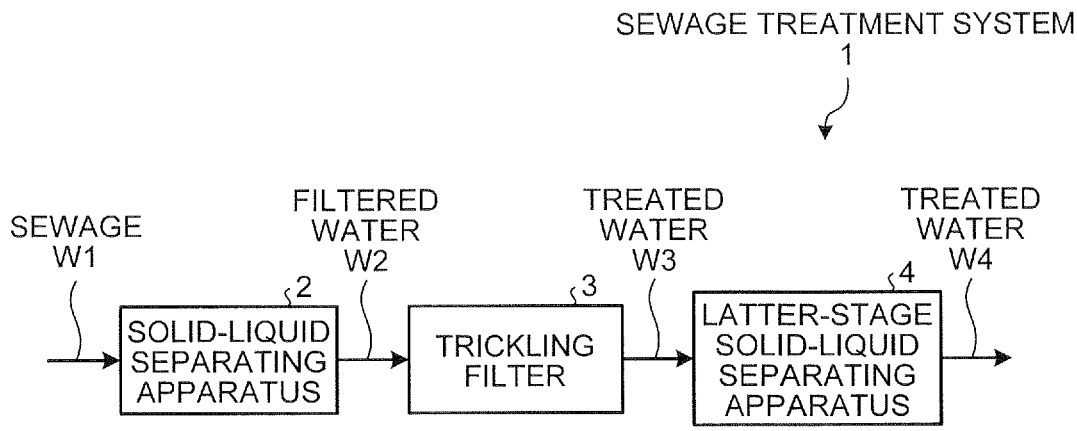
FIG. 1 is a block diagram illustrating a schematic configuration of a sewage treatment system according to a first embodiment of the present invention.

First, a configuration of a sewage treatment system according to a first embodiment of the present invention will be described. FIG. 1 is a block diagram illustrating a schematic configuration of a sewage treatment system according to a first embodiment of the present invention. As illustrated in FIG. 1, a sewage treatment system 1 according to the first embodiment includes a solid-liquid separating apparatus 2 that performs solid-liquid separating treatment of sewage W1 to be treated, a trickling filter 3 that performs biotreatment of filtered water W2 acquired by the solid-liquid separating apparatus 2, and a latter-stage solid-liquid separating apparatus 4 that performs additional solid-liquid separating treatment of treated water W3 acquired by the trickling filter 3.

The solid-liquid separating apparatus 2 is used to perform a first-step purifying treatment of sewage W1 to be treated. In detail, the solid-liquid separating apparatus 2 receives the sewage W1 such as living drainage water or factory drainage water and performs a solid-liquid separating treatment of the sewage W1. In the solid-liquid separating treatment, the solid-liquid separating apparatus 2 filters the sewage W1 by using a filter (a levitation filtering media to be described below) having a special shape such as a windmill shape. By this configuration, the solid-liquid separating apparatus 2 catches solid components in the sewage W1, for example, impurities, SS, and solid BOD at the same time. As a result, the solid-liquid separating apparatus 2 exhaustively removes the solid components in the sewage W1 and acquires filtered water W2. The solid-liquid separating apparatus 2 changes a filtering speed of the sewage W1 according to an inflow quantity of the sewage W1 into the solid-liquid separating apparatus 2 which varies by weather, and as a result, the sewage W1 is subjected to a high-efficiency solid-liquid separating treatment. For example, when the inflow quantity of the sewage W1 is increased in the rain as compared with in a clear day, the solid-liquid separating apparatus 2 increases the filtering speed with the rise of the sewage W1 and performs a high-speed filtering treatment of the sewage W1. As a result, the solid-liquid separating apparatus 2 efficiently separates the sewage W1 into the solid components in the sewage W1 and the filtered water W2 even in case of rain. The solid-liquid separating apparatus 2 delivers the acquired filtered water W2 to the trickling filter 3. Meanwhile, the solid-liquid separating apparatus 2 has a reverse washing function to wash a filtering means required to perform the solid-liquid separating treatment of the sewage W1 and effectuates the reverse washing function at the predetermined timing.

The trickling filter 3 is used to perform a second-step purifying treatment of the sewage W1 to be treated. In detail, the trickling filter 3 is installed on a latter stage (that is, a downstream side) of the solid-liquid separating apparatus 2 and receives the filtered water W2 acquired by the solid-liquid separating apparatus 2. Subsequently, the trickling filter 3 biotreats the filtered water W2 to acquire treated water W3. Thereafter, the trickling filter 3 delivers the treated water W3 to the latter-stage solid-liquid separating apparatus 4. The trickling filter 3 has a washing function of a filtering means required to biotreat the filtered water W2 and effectuates the washing function at the predetermined timing.

The latter-stage solid-liquid separating apparatus 4 is used to perform a third-step purifying treatment of the sewage W1 to be treated. In detail, the latter-stage solid-liquid separating apparatus 4 is a solid-liquid separating means installed on a latter stage of the trickling filter 3. The latter-stage solid-liquid separating apparatus 4 receives the treated water W3 acquired by the trickling filter 3, and performs solid-liquid separation of two steps of a precipitation treatment of comparatively coarse solid components in the treated water W3 and a filtering treatment of fine solid components that are not precipitated but left. In the solid-liquid separating treatment of the treated water W3, the latter-stage solid-liquid separating apparatus 4 uses a filtering medium having a special shape such as a cylindrical shape in order to increase an SS removal rate, and also performs a low-speed filtering treatment in comparison with the solid-liquid separating apparatus 2 described above. By this configuration, the latter-stage solid-liquid separating apparatus 4 can substantially catch and remove even the fine solid components in the treated water W3. Meanwhile, the latter-stage solid-liquid separating apparatus 4 has a washing function to wash a filtering means required to perform the solid-liquid separating treatment of the treated water W3 and effectuates the washing function at the predetermined timing.

Subsequently, the solid-liquid separating apparatus 2 illustrated in FIG. 1 will be described in detail. Herein, first, a configuration of the solid-liquid separating apparatus 2 will be described and thereafter, the solid-liquid separating treatment of the sewage W1 by the solid-liquid separating apparatus 2 will be described.

Figure 2:
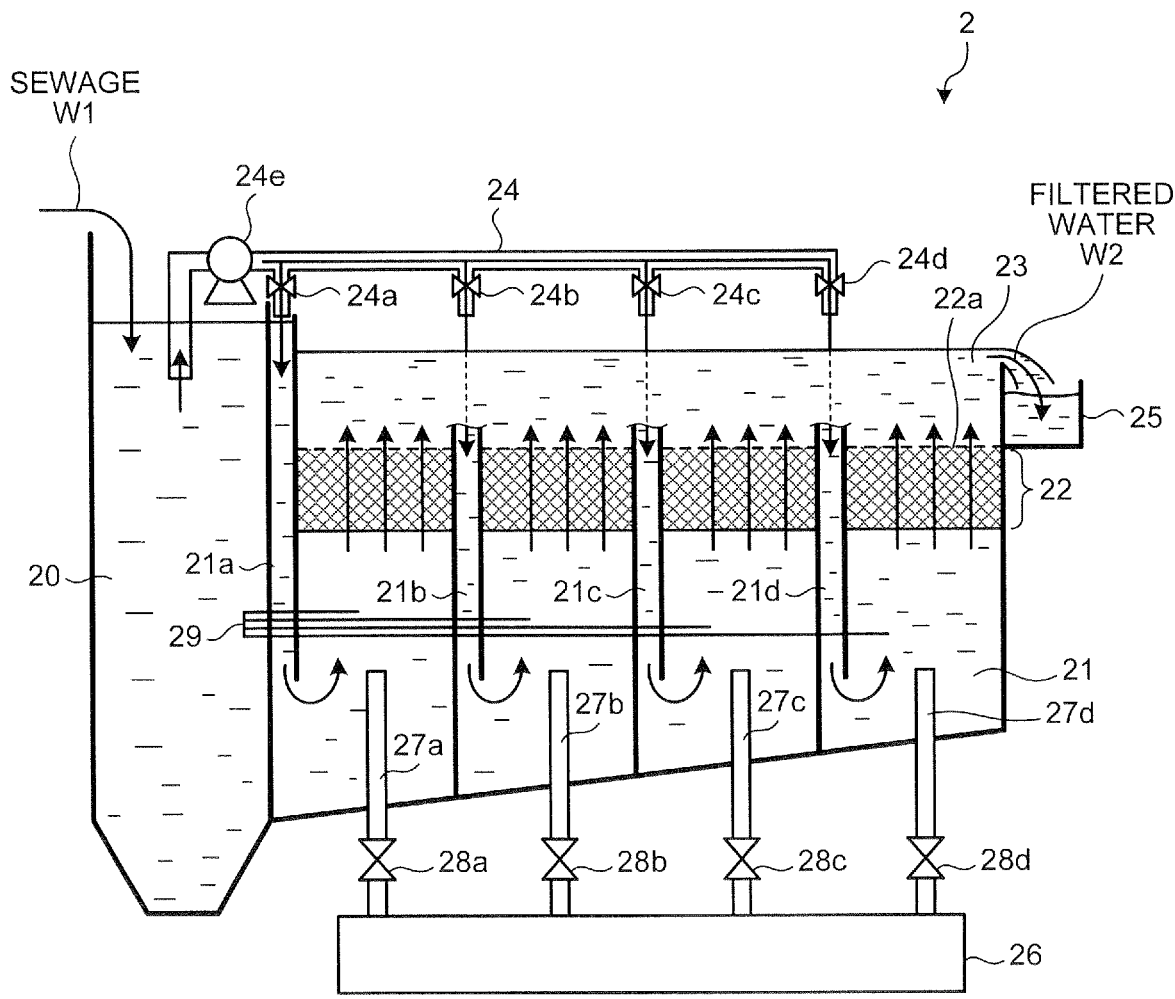
FIG. 2 is a schematic diagram illustrating a configuration example of a solid-liquid separating apparatus of the sewage treatment system according to the first embodiment of the present invention.

FIG. 2 is a schematic diagram illustrating a configuration example of the solid-liquid separating apparatus of the sewage treatment system according to the first embodiment of the present invention. As illustrated in FIG. 2, the solid-liquid separating apparatus 2 includes a distribution tank 20 and a filtering tank 21 that reserve the sewage W1 to be treated. The solid-liquid separating apparatus 2 includes a filtering medium packed layer 22 (a first filtering medium packed layer) for performing the solid-liquid separating treatment of the sewage W1 and a common filtering tank 23 for reserving the filtered water W2 acquired by the solid-liquid separating treatment. The solid-liquid separating apparatus 2 includes a plurality of inflow pipes 21a to 21d, a distribution pipe 24, valves 24a and 24d, and a pump 24e for circulating the sewage W1 and an open channel 25 for circulating the filtered water W2 in the trickling filter 3.

Further, the solid-liquid separating apparatus 2 includes, as the reverse washing means for executing the reverse washing function of the filtering medium packed layer 22, a drainage tank 26, a plurality of drainage pipes 27a to 27d and drainage valves 28a to 28d, and an air pipe 29, as illustrated in FIG. 2.

The distribution tank 20 is a tank that receives the sewage W1 from the outside and is separated from the filtering tank 21 by a wall. The filtering tank 21 is a tank that reserves the sewage W1 before executing the solid-liquid separating treatment (filtering treatment). The filtering tank 21 is placed below the filtering medium packed layer 22, and divided into a plurality of tanks for the respective inflow pipes 21a to 21d, as illustrated in FIG. 2.

The plurality of inflow pipes 21a to 21d are pipes that allows the sewage W1 to flow into the plurality of tanks of the filtering tank 21. The inflow pipes 21a to 21d are placed in the tanks of the filtering tank 21, respectively, as illustrated in FIG. 2.

The filtering medium packed layer 22 is used to perform the solid-liquid separating treatment of the sewage W1 reserved in the filtering tank 21. In detail, the filtering medium packed layer 22 is placed above each tank of the filtering tank 21 and has a layer thickness of 800 mm or less, more preferably, 600 mm or less. A plurality of levitation filtering media (not illustrated) are packed in the filtering medium packed layer 22 to form a minute void enough to catch the solid components in the sewage W1. A screen 22a is installed on the top of the filtering medium packed layer 22. The screen 22a prevents the levitation filtering medium in the filtering medium packed layer 22 from being leaked while allowing liquid components to be passed.

Herein, as the levitation filtering medium in the filtering medium packed layer 22, a material is used, which has an apparent specific gravity in the range of 0.1 to 0.8, 50% compression hardness of 0.1 MPa or more, and a size in the range of 4 to 10 mm. When the apparent specific gravity is less than 0.1, a preferable compression strength may not be acquired and when the apparent specific gravity is more than 0.8, a difference in specific gravity between the material and water decreases, and as a result, the material may be leaked from the filtering medium packed layer 22. The reason for setting the 50% compression hardness to 0.1 MPa or more is that when the material is softer, the material is consolidated at the time of filtering the sewage W1 by using a high-speed water stream, and as a result, an SS catching capability deteriorates. Furthermore, when the size is less than 4 mm, a gap between the levitation filtering media decreases, and as a result, obturation is likely to occur; on the other hand, when the size is 10 mm, the SS catching capability by the levitation filtering medium deteriorates.

The levitation filtering medium having such characteristics may be fabricated by using expanded polyethylene, expanded polystyrene, expanded polypropylene, and the like. The shape of the levitation filtering medium has a shape with unevenness, such as the windmill shape or a cross shape. By this configuration, when the filtering medium packed layer 22 is packed with the levitation filtering medium, a nonlinear gap is formed between the packed levitation filtering media, and as a result, an SS catching effect by each levitation filtering medium can be improved. In order to improve the SS catching effect of the filtering medium packed layer 22, it is preferable to adjust a ratio (that is, a void ratio of the filtering medium packed layer 22) of a void volume between the levitation filtering media for a total volume of the filtering medium packed layer 22 to approximately 50%.

The common filtering tank 23 is used to reserve the filtered water W2 acquired by the solid-liquid separating treatment of the sewage W1. In detail, the common filtering tank 23 is a common tank that is placed above the filtering medium packed layer 22 and collects each filtered water W2 acquired by performing the solid-liquid separating treatment of each sewage W1 in each tank of the filtering tank 21 as illustrated in FIG. 2.

The distribution pipe 24, the valves 24a to 24d, and the pump 24e are used to distribute the sewage W1 in the distribution tank 20 to each tank of the filtering tank 21. In detail, the distribution pipe 24 is a pipe that connects the distribution tank 20 and the plurality of inflow pipes 21a to 21d. Each of the valves 24a to 24d is placed around each flowing water inlet of the distribution pipe 24 and the pump 24e is placed in the distribution pipe 24. When the valves 24a to 24d are opened, the distribution pipe 24 distributes and circulates the sewage W1 from the distribution tank 20 to the plurality of inflow pipes 21a to 21d by an action of the pump 24e, and circulates the sewage W1 to each tank of the filtering tank 21 through each of the inflow pipes 21a to 21d. The valves 24a to 24d may be individually opened/closed. As a result, by opening/closing the valves 24a to 24d, the sewage W1 may flow into a tank, which is desired to receive the sewage W1, among the respective tanks of the filtering tank 21. In FIG. 2, an upper part of the inflow pipes 21b to 21d is not illustrated, but each of the inflow pipes 21b to 21d is connected with the distribution pipe 24.

The open channel 25 is used to circulate the filtered water W2 in the common filtering tank 23 in the trickling filter 3 (see FIG. 1) positioned on the latter stage of the solid-liquid separating apparatus 2. In detail, the open channel 25 is a channel of which the top is opened and connects the trickling filter 3 illustrated in FIG. 1 with the common filtering tank 23. The open channel 25 receives the filtered water W2 that falls free from the common filtering tank 23 and allows the received filtered water W2 to fall free to the trickling filter 3.

The drainage tank 26, the plurality of drainage pipes 27a to 27d, the drainage valves 28a to 28d, and the air pipe 29 constitute the reverse washing means for executing the reverse washing function of the filtering medium packed layer 22 in the solid-liquid separating apparatus 2 as described above. In detail, the drainage tank 26 reserves a washed liquid (hereinafter, referred to as a reverse washing drainage water) after reversely washing the filtering medium packed layer 22. The drainage pipes 27a to 27d are pipes that connect the respective tanks of the filtering tanks 21 and the drainage tank 26, respectively. The drainage valves 28a to 28d are placed on the drainage pipes 27a to 27d, respectively, and open/close the drainage pipes 27a to 27d. The air pipe 29 ejects air that contributes to the reverse washing of the filtering medium packed layer 22 into the filtering medium packed layer 22.

Subsequently, referring to the flow of the sewage W1 or the filtered water W2 marked with a solid arrow of FIG. 2, the solid-liquid separating treatment of the sewage W1 by the solid-liquid separating apparatus 2 will be described. The sewage W1, as polluted water from the outside, such as the living drainage water or the factory drainage water, first flows into the distribution tank 20. In this case, the sewage W1 may forcibly flow in by using power of a pump, and the like or flow in by a natural stream.

The sewage W1 reserved in the distribution tank 20 is circulated in the distribution pipe 24 to be distributed to each of the inflow pipes 21a to 21d. Subsequently, the sewage W1 in each of the inflow pipes 21a to 21d falls free and flows into the filtering tank 21 and thereafter, flows into each tank of the filtering tank 21 as illustrated by the solid arrow of FIG. 2.

The sewage W1 in each tank of the filtering tank 21 passes through the filtering medium packed layer 22 upward. In this case, the sewage W1 in each tank is filtered by the filtering medium packed layer 22 while the sewage W1 passes though the filtering medium packed layer 22 from the bottom to the top of the filtering medium packed layer 22 as illustrated by the solid arrow of FIG. 2. That is, the filtering medium packed layer 22 exhaustively catches various solid components such as the impurities, the SS, and the solid BOD included in the upward sewage W1 that passes through the void between the respective levitation filtering media by each levitation filtering medium therein to fully separate the upward sewage W1 into the solid components and the filtered water W2. Therefore, the solid-liquid separating treatment of the sewage W1 by the solid-liquid separating apparatus 2 is achieved. The filtering speed of the sewage W1 by the filtering medium packed layer 22 is adjusted according to the inflow quantity of the sewage W1 into the distribution tank 20, and as a result, the sewage W1 can be filtered rapidly. Therefore, the solid-liquid separating apparatus 2 can perform a high-efficiency solid-liquid separating treatment of the sewage W1.

The filtered water W2 acquired by the solid-liquid separating treatment flows into (joins in) the common filtering tank 23 through the screen 22a. Thereafter, the filtered water W2 flows into the open channel 25 and flows from the common filtering tank 23 to the trickling filter 3 as illustrated by the solid arrow of FIG. 2.

Subsequently, the trickling filter 3 illustrated in FIG. 1 will be described in detail. Herein, first, a configuration of the trickling filter 3 will be described and thereafter, biotreatment (filtering treatment) of the filtered water W2 using the trickling filter 3 will be described.

Figure 3:
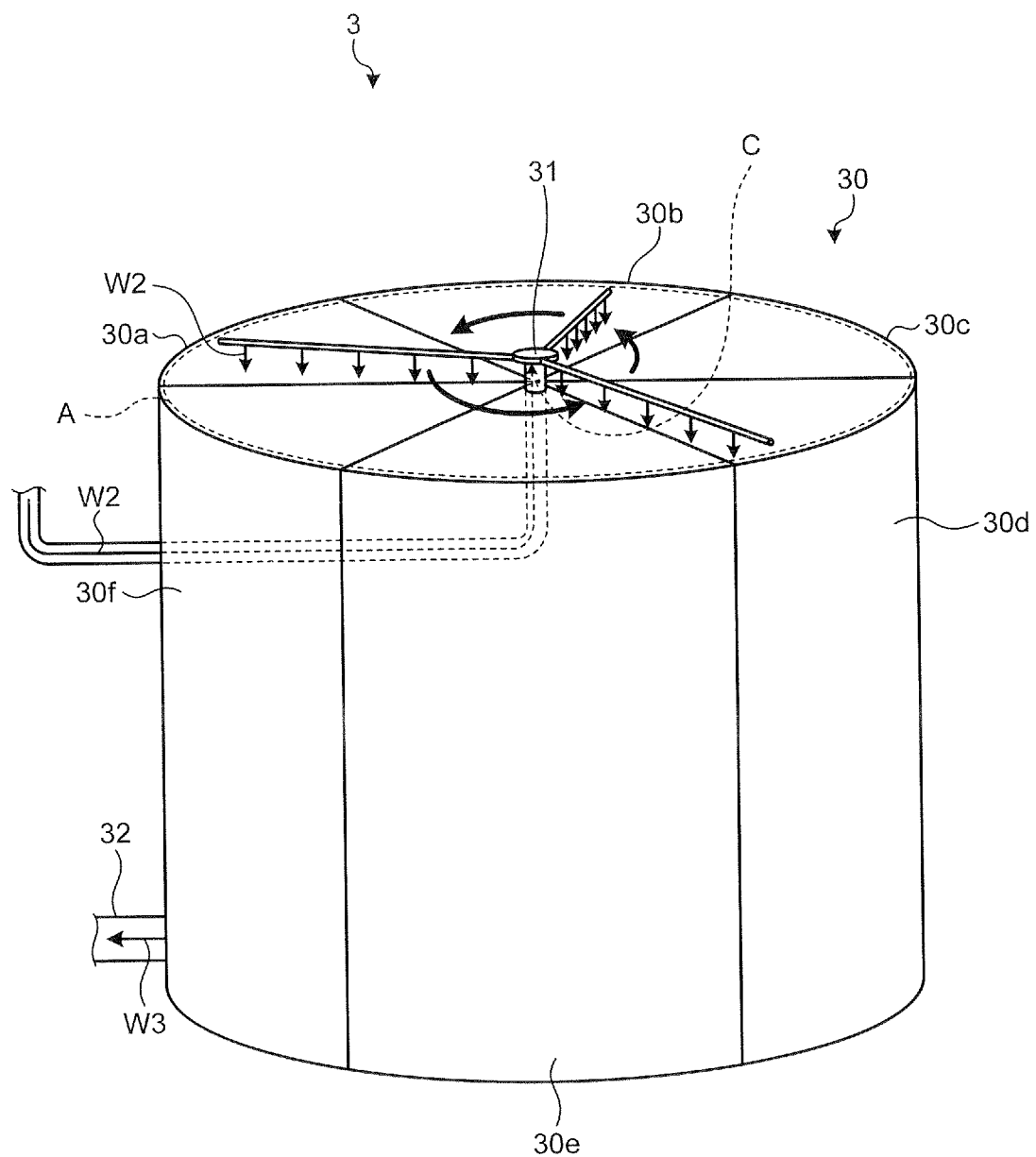
FIG. 3 is a schematic diagram illustrating a configuration example of a trickling filter of the sewage treatment system according to the first embodiment of the present invention.

FIG. 3 is a schematic diagram illustrating a configuration example of the trickling filter of the sewage treatment system according to the first embodiment of the present invention. As illustrated in FIG. 3, the trickling filter 3 includes a filter body 30 including a layer (a second filtering medium packed layer) packed with a filter medium attached with microorganisms, a rotary trickling device 31 for trickling the filtered water W2 acquired by the solid-liquid separating apparatus 2 in the inside of the filter body 30, and a circulation pipe 32 for connecting the inside of the filter body 30 and the latter-stage solid-liquid separating apparatus 4 illustrated in FIG. 1. Although not particularly illustrated in FIG. 3, the trickling filter 3 includes a washing means for executing a washing function to wash the filtering medium packed layer in the filter body 30.

The filter body 30 is a tank that is packed with a plurality of filtering media having the microorganisms attached to the surface thereof and is configured by combining six treatment tanks 30a to 30f as illustrated in FIG. 3. Each of the treatment tanks 30a to 30f has a water treatment function to biotreat and to purify the filtered water W2 by the microorganisms in the filtering medium packed layer, and a washing function to wash the filtering medium packed layer. Configurations of the treatment tanks 30a to 30f will be described below in detail.

The rotary trickling device 31 is used to trickle the filtered water W2 that flows out from the solid-liquid separating apparatus 2 described above to the inside of each of the treatment tanks 30a to 30f of the filter body 30. In detail, the rotary trickling device 31 is piped to be connected with the open channel 25 of the solid-liquid separating apparatus 2 illustrated in FIG. 2. A pipe of the rotary trickling device 31 passes through the inside of the filter body 30 from the open channel 25 as illustrated in FIG. 3, and extends upward from the center C of the filter body 30 to be exposed to the top of the filter body 40. A rotation mechanism that rotates in a circumferential direction of the filter body 30 by a water stream is provided on the end of the pipe. A plurality of (for example, three) trickling nozzles are provided on the top of the filter body 30 radially toward a circumference portion A of the filter body 30 from the rotation mechanism. Each of the plurality of trickling nozzles is connected with the pipe of the rotary trickling device 31 and rotates in the circumferential direction of the filter body 30 by an action of the rotation mechanism. The number of the trickling nozzles of the rotary trickling device 31 is not limited to three (see FIG. 3) and may be one or multiple. The rotary trickling device 31 receives the filtered water W2 from the solid-liquid separating apparatus 2 through the pipe and rotates each trickling nozzle together with the rotation mechanism by the flow of the filtered water W2. The rotary trickling device 31 uniformly trickles the filtered water W2 onto the top of each filtering medium packed layer in the treatment tanks 30a to 30f from a trickling port of each trickling nozzle that rotates as described above.

The circulation pipe 32 is used to circulate the treated water W3, which is acquired by biotreating the filtered water W2 by the treatment tanks 30a to 30f of the filter body 30, to the latter-stage solid-liquid separating apparatus 4 (see FIG. 1) positioned on the latter stage of the trickling filter 3. In detail, the circulation pipe 32 is a pipe for connecting a lower layer of the filter body 30, that is, a lower layer of each of the treatment tanks 30a to 30f and the latter-stage solid-liquid separating apparatus 4. The circulation pipe 32 circulates the treated water W3 to the latter-stage solid-liquid separating apparatus 4 from the lower layer of each of the treatment tanks 30a to 30f by free-fall or operating the pump, and the like.

Subsequently, configurations of the treatment tanks 30a to 30f described above will be described in detail. Since the respective configurations of the treatment tanks 30a to 30f are the same, the configuration of the treatment tank 30a will be representatively described below.

Figure 4:
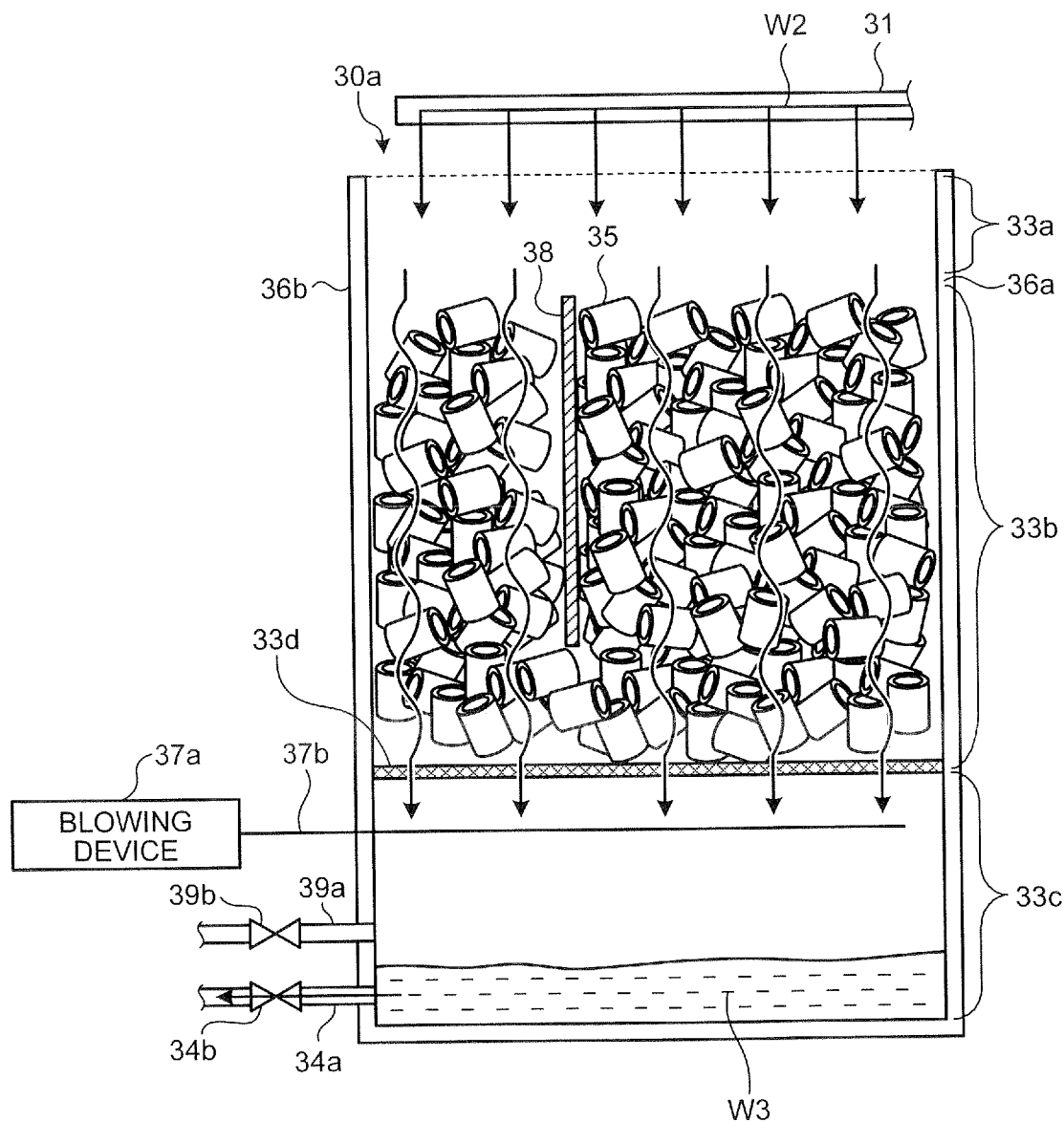
FIG. 4 is a schematic diagram illustrating a configuration example of a treatment tank of the trickling filter in the first embodiment.

FIG. 4 is a schematic diagram illustrating a configuration example of the treatment tank of the trickling filter in the first embodiment. As illustrated in FIG. 4, the treatment tank 30a includes a filtering medium packed layer 33b (second filtering medium packed layer) packed with a filtering medium 35 attached with the microorganisms, a circulation pipe 34a for connecting the circulation pipe 32 (see FIG. 3) of the filter body 30 and the inside of the treatment tank 30a, and a filtering medium outflow preventing net 33d for preventing the outflow of the filtering medium 35. The treatment tank 30a includes, as a washing means for executing a washing function of the filtering medium packed layer 33b, valves 34b and 39b, a blowing device 37a, an air ejection pipe 37b, a baffle plate 38, and a washing drainage pipe 39a.

The treatment tank 30a is a tank packed with the filtering medium 35 having the microorganism attached on the surface thereof and is divided into the filtering medium packed layer 33b, and an upper layer 33a and a lower layer 33c of the filtering medium packed layer 33b. The upper layer 33a of the treatment tank 30a is opened, and the outside and the inside of the treatment tank 30a are ventilated by the opening. The trickling nozzle of the rotary trickling device 31 is positioned on the upper layer 33a of the treatment tank 30a, and the lower layer 33c of the treatment tank 30a is connected with the circulation pipe 34a and the washing drainage pipe 39a.

The filtering medium packed layer 33b is used to biotreat the filtered water W2 acquired by using the solid-liquid separating apparatus 2. The plurality of filtering media 35 are packed in the filtering medium packed layer 33b so as to form a void for allowing the filtered water W2 falls free toward the lower layer 33c from the upper layer 33a. The filtering medium outflow preventing net 33d is placed in the filtering medium packed layer 33b and supports the plurality of filtering media 35 in the filtering medium packed layer 33b. The filtering medium outflow preventing net 33d prevents the outflow of the filtering medium 35 to the lower layer 33c from the filtering medium packed layer 33b while passing the liquid component. The treated water W3 acquired by biotreating the filtered water W2 by using the filtering medium packed layer 33b passes through the filtering medium outflow preventing net 33d, falls free from the bottom of the filtering medium packed layer 33b, and flows to the lower layer 33c of the treatment tank 30a.

Herein, the filtering medium 35 is acquired by attaching the microorganism onto the surface of a material such as polyurethane or polypropylene and a specific gravity thereof is a value approximate to the specific gravity (=1.0) of water, for example, 0.9. The filtering medium 35 is for example, a cylindrical filtering medium having a cylindrical shape as illustrated in FIG. 4. A surface state of each of an interior and an exterior of a cylinder of the filtering medium 35 may be planar, but a surface state which is effective to increase a contact area to the filtered water W2, for example, a fine unevenness state, a bellows state, or a combination state thereof is preferable. In the filtering medium packed layer 33b packed with the cylindrical filtering medium 35, a nonlinear void is formed between the respective filtering media 35 and the void is formed by a cylindrical hollow portion of each filtering medium 35. In this case, a ratio of the void volume by each filtering medium 35 to a total volume of the filtering medium packed layer 33b, that is, a void ratio of the filtering medium packed layer 33b is for example, approximately 90%. An outer wall surface and an inner wall surface of the filtering medium 35 contact the filtered water W2 that falls in these voids, and as a result, a contact area between the filtering medium 35 and the filtered water W2 significantly increases. Therefore, a biotreatment capability of the filtered water W2 by the filtering medium packed layer 33b (each filtering medium 35) is improved to a level or more required with respect to the treatment tank 30a.

The valves 34b and 39b, the blowing device 37a, the air ejection pipe 37b, the baffle plate 38, and the washing drainage pipe 39a constitute a washing means for executing a washing function of the filtering medium packed layer 33b in the treatment tank 30a. The valve 34b closes an opening of the circulation pipe 34a and interrupts the circulation of the treated water W3 to the latter-stage solid-liquid separating apparatus 4 during a period in which a washing liquid flows into the treatment tank 30a to exhibit the washing function of the filtering medium packed layer 33b.

The blowing device 37a feeds air required to wash each filtering medium 35 in the filtering medium packed layer 33b to the air ejection pipe 37b. The air ejection pipe 37b ejects air to the washing liquid in which the filtering medium packed layer 33b is at least submerged in the treatment tank 30a and generates a swirl flow to agitatedly wash each filtering medium 35 in the filtering medium packed layer 33b to the washing liquid. In detail, the air ejection pipe 37b is placed on the lower layer 33c of the treatment tank 30a as illustrated in FIG. 4. The air ejection pipe 37b ejects the air from the blowing device 37a toward the filtering medium packed layer 33b from the vicinity of a center wall 36a or the lower layer 33c of the treatment tank 30a to generate a vertical swirl flow of the washing liquid. The filtering medium packed layer 33b is a layer in the treatment tank 30a that represents the filter body 30 illustrated in FIG. 3 and is just one of the filtering medium packed layers (second filtering medium packed layers) in the trickling filter 3.

The baffle plate 38 is a boundary plate that partitions an in-tank region of the treatment tank 30a into a region at the center wall 36a of the treatment tank 30a and a region at a circumference wall 36b as illustrated in FIG. 4. The center wall 36a is a side wall at the center C side of the filter body 30 illustrated in FIG. 3 among side walls of the treatment tank 30a. The circumference wall 36b is a side wall at the circumference portion A side of the filter body 30 among the side walls of the treatment tank 30a. The baffle plate 38 is provided at a position closer to the circumference wall 36b (that is, an outer wall side of the filter body 30) than the center wall 36a as illustrated in FIG. 4 and partitions the in-tank region of the treatment tank 30a as described above. As such, the baffle plate 38 partitions the in-tank region of the treatment tank 30a into a region (hereinafter, referred to as a center-side region) where air is ejected from the air ejection pipe 37b and a region (hereinafter, referred to as a circumference-side region) where air is not ejected. The baffle plate 38 interrupts some of washing liquids generated by ejecting air to the washing liquid reserved in the treatment tank 30a from the air ejection pipe 37b, thereby promoting the generation of the swirl flow (in detail, the vertical swirl flow) of the washing liquid. The center-side region in the treatment tank 30a is the ejection region of air in the trickling filter 3 and the circumference-side region in the treatment tank 30a is the non-ejection region of air in the trickling filter 3. That is, the baffle plate 38 partitions the inside of the trickling filter 3 into the ejection region and the non-ejection region and is just one boundary plate that promotes the generation of the swirl flow of the washing liquid.

The washing drainage pipe 39a is a discharge pipe for discharging the washing liquid after agitatedly washing each filtering medium 35. The valve 39b is a valve for opening/closing the washing drainage pipe 39a. The washing drainage pipe 39a discharges the washing liquid after agitatedly washing each filtering medium 35 by using the swirl flow of the washing liquid described above to the outside from the lower layer 33c of the treatment tank 30a during a period when the washing drainage pipe 39a is opened by the valve 39b.

Subsequently, referring to the flow of the filtered water W2 or the treated water W3 marked with an arrow of FIG. 4, the biotreatment of the filtered water W2 using the treatment tank 30a will be described. The filtered water W2 is circulated in the pipe of the rotary trickling device 31 from the solid-liquid separating apparatus 2 and flows into the treatment tank 30a. In this case, the filtered water W2 falls free from each trickling nozzle of the rotary trickling device 31 and is trickled to the top of the filtering medium packed layer 33b.

The filtered water W2 trickled onto the top of the filtering medium packed layer 33b falls free along with the ventilation of the filtering medium packed layer 33b to pass through the filtering medium packed layer 33b. For example, the filtered water W2 trickled from the rotary trickling device 31 falls free while sequentially contacting the surfaces of the respective filtering media 35, as illustrated by a wavy-line arrow of FIG. 4. When the filtering medium 35 and the filtered water W2 contact each other, the microorganisms on the surface of the filtering medium 35 decomposes an organic material in the filtered water W2.

As such, the filtered water W2 that falls in the filtering medium packed layer 33b is continuously biotreated by the microorganisms whenever contacting the filtering medium 35, and as a result, the corresponding water falls to the lower layer 33c of the treatment tank 30a from the filtering medium outflow preventing net 33d as the treated water W3 decomposed and removed with the organic material. Therefore, the biotreatment of the filtered water W2 by the treatment tank 30a is achieved.

The treated water W3 acquired by the biotreatment flows out to the circulation pipe 34a from the lower layer 33c of the treatment tank 30a via the valve 34b and thereafter, is circulated in the circulation pipe 32 (see FIG. 3) through the circulation pipe 34a and flows to the latter-stage solid-liquid separating apparatus 4 from the circulation pipe 32. In this case, since the valve 34b is opened, the treated water W3 falls to the lower layer 33c and thereafter, directly flows into the circulation pipe 34a. As a result, when the biotreatment described above is executed, the treated water W3 is never accumulated up to the height of the top of the filtering medium packed layer 33b.

Incidentally, a water treatment function of the filtered water W2 by the treatment tanks 30b to 30f of the filter body 30 illustrated in FIG. 3 is similar to the case of the treatment tank 30a described above. That is, each of the treatment tanks 30b to 30f biotreats the filtered water W2 trickled onto the top of the filtering medium packed layer from each trickling nozzle of the rotary trickling device 31 by the microorganisms on the surface of each filtering medium 35 similarly to the treatment tank 30a and delivers the treated water W3 acquired thereby to the latter-stage solid-liquid separating apparatus 4 through the circulation pipe 32, and the like.

Subsequently, the latter-stage solid-liquid separating apparatus 4 illustrated in FIG. 1 will be described in detail. Herein, first, a configuration of the latter-stage solid-liquid separating apparatus 4 will be described and thereafter, the solid-liquid separating treatment of the treated water W3 by the latter-stage solid-liquid separating apparatus 4 will be described.

Figure 5:
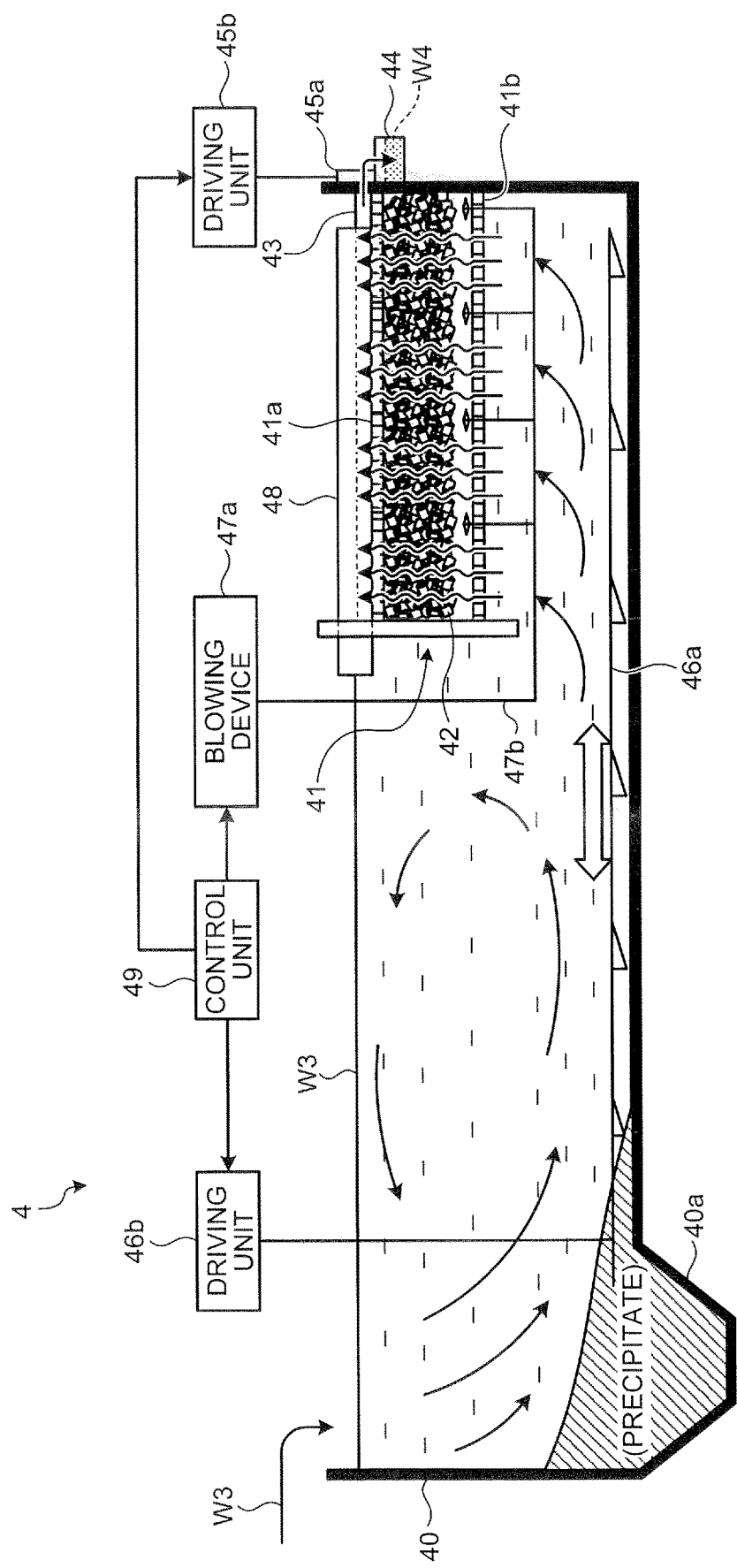
FIG. 5 is a schematic diagram illustrating a configuration example of a solid-liquid separating apparatus at a latter stage of the sewage treatment system according to the first embodiment of the present invention.

FIG. 5 is a schematic diagram illustrating a configuration example of the latter-stage solid-liquid separating apparatus of the sewage treatment system according to the first embodiment of the present invention. As illustrated in FIG. 5, the latter-stage solid-liquid separating apparatus 4 includes a precipitation unit 40 for receiving the treated water W3 from the trickling filter 3 and precipitating the received treated water W3, a filtering unit 41 for filtering the treated water W3 after the precipitation, a treated water channel 43 and a drainage channel 44 for discharging treated water W4 acquired by the filtering, and an electric gate 45a and a driving unit 45b for opening/closing a flow route from the treated water channel 43 to the drainage channel 44. The latter-stage solid-liquid separating apparatus 4 includes a reciprocating scraping machine 46a for scraping a precipitate separated from the treated water W3 by precipitating the treated water W3 to a precipitate collecting unit 40a and a driving unit 46b for actuating the reciprocating scraping machine 46a. The latter-stage solid-liquid separating apparatus 4 includes, as a washing means for executing a washing function of each filtering medium 42 packed in the filtering unit 41, a blowing device 47a, an air ejection pipe 47*b*, and a washing drainage channel 48. The latter-stage solid-liquid separating apparatus 4 includes a control unit 49 for controlling an operation of each of the driving units 45*b* and 46*b*, and the blowing device 47*a*.

The precipitation unit 40 precipitates the solid components such as sludge in the treated water W3 while receiving the treated water W3 from the trickling filter 3 (see FIGS. 1 and 3). In detail, the precipitation unit 40 precipitates the solid components in the treated water W3 from the trickling filter 3 onto the bottom. The precipitation unit 40 allows the treated water W3 from which the solid components such as the sludge are removed, that is, the treated water W3 after the precipitation to naturally flow to the bottom of the filtering unit 41 by using a flow when the treated water W3 flows in.

Further, the precipitation unit 40 has the precipitate collecting unit 40*a* at an inflow side of the treated water W3. The precipitate collecting unit 40*a* collects the solid components such as the sludge precipitated and separated from the treated water W3 in the precipitation unit 40 as the precipitate. The precipitate in the precipitate collecting unit 40*a* is drawn from the precipitate collecting unit 40*a* through a discharge pipe (not illustrated) and the like whenever a predetermined period elapsed or a predetermined quantity of precipitates are collected.

The filtering unit 41 is used to further perform the solid-liquid treatment (filtering treatment) of the treated water W3 described above after the precipitation. In detail, the filtering unit 41 is placed at the drainage channel 44 in the precipitation unit 40 and has a plurality of filtering media 42 in each tank, which are divided into plural media (for example, a lattice shape) by inner walls. The plurality of filtering media 42 are packed in each tank of the filtering unit 41, and forms a minute void enough to catch the solid components (SS, and the like) in the treated water W3 after the precipitation, in the filtering unit 41. The filtering unit 41 filters the treated water W3 after the precipitation by using the plurality of filtering media 42. In the filtering, the filtering unit 41 circulates the treated water W3 after the precipitation upward in the filtering unit 41 as a lower-speed flow than the solid-liquid separating apparatus 2 illustrated in FIG. 2. Therefore, the filtering unit 41 allows treated water W4 acquired by removing the solid components from the treated water W3 to flow out into the treated water channel 43 on the top thereof while catching the solid components such as the SS in the treated water W3 after the precipitation in the voids of the plurality of filtering media 42, in detail, on the surface of each filtering medium 42.

Herein, the filtering medium 42 in the filtering unit 41 has substantially the same configuration as that of the filtering medium 35 (see FIG. 4) of the trickling filter 3 described above except that a biofilm is not formed on the surface thereof. That is, the filtering medium 42, which is the cylindrical filtering medium having the cylindrical shape, is smaller than the filtering medium 35 described above and the specific gravity of the filtering medium 42 is a value approximate to the specific gravity of water, for example, 0.9. A surface state of each of an interior and an exterior of a cylinder of the filtering medium 42 may be planar, but may be other state, for example, the fine unevenness state or the bellows state. The cylindrical filtering medium 42 forms a void by a cylindrical hollow portion while forming the nonlinear void between the filtering media, similarly to the filtering medium 35 in the filtering medium packed layer 33*b* illustrated in FIG. 4, in the filtering unit 41. A void ratio of the filtering medium packed layer in the filtering unit 41 packed with the filtering medium 42 is, for example, approximately 90%. As a result, a contact area between the filtering medium 42 and the treated water W3 significantly increases, and as a result, a filtering treatment capability of the treated water W3 by each filtering medium 42 is improved to a level or more required with respect to the filtering unit 41.

Meanwhile, a screen 41*a* is placed on the top of the filtering unit 41 and a screen 41*b* is placed on the bottom of the filtering unit 41. The screens 41*a* and 41*b* prevent the filtering medium 42 from being leaked from the inside of the filtering unit 41 while passing the liquid component.

Figure 6:
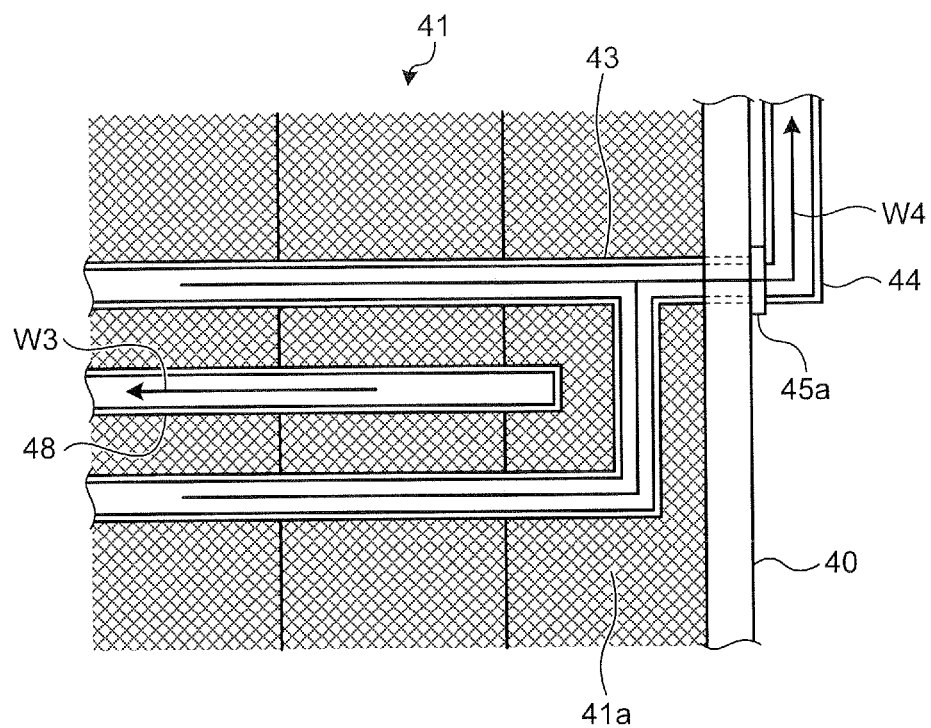
FIG. 6 is a schematic diagram illustrating a configuration example of a collect on a filtering unit.

The treated water channel 43 forms a drainage route of the treated water W4 acquired by the filtering unit 41 and is placed on the top of the filtering unit 41. FIG. 6 is a schematic diagram illustrating a configuration example of the treated water channel on the filtering unit. As illustrated in FIGS. 5 and 6, the treated water channel 43 is a channel of which the top is opened and a plurality of drainage routes connected to the drainage channel 44 are formed on the top of the filtering unit 41. The treated water channel 43 receives the treated water W4 which overflows on the top of the filtering unit 41 through the screen 41*a* and allows the treated water W4 to fall free to the drainage channel 44 through an opening formed on a side wall of the precipitation unit 40. A side wall of the treated water channel 43 is lower than the washing drainage channel 48. As a result, the treated water W4 that overflows on the top of the filtering unit 41 flows into the treated water channel 43 without flowing into the washing drainage channel 48 during a period when the electric gate 45*a* opens the drainage channel to the drainage channel 44 from the treated water channel 43, that is, a period when the treated water W3 is filtered.

The drainage channel 44 is used to drain the treated water W4 to the outside of the latter-stage solid-liquid separating apparatus 4. In detail, the drainage channel 44 is a channel of which the top is opened and connects the treated water channel 43 and the outside of the latter-stage solid-liquid separating apparatus 4 through the opening of the side wall of the precipitation unit 40. The drainage channel 44 receives the treated water W4 that falls free from the treated water channel 43 and allows the received treated water W4 to fall free to the outside. As a result, the drainage channel 44 is used to drain the treated water W4 to the outside of the latter-stage solid-liquid separating apparatus 4.

The electric gate 45*a* and the driving unit 45*b* are used to open/close a connection route between the treated water channel 43 and the drainage channel 44 described above. In detail, the electric gate 45*a* is placed at the opening formed on the side wall of the precipitation unit 40. The driving unit 45*b* is a driving source of an opening/closing operation of the electric gate 45*a*. That is, the electric gate 45*a* performs an opening/closing operation of the opening by an action of the driving unit 45*b* to thereby open/close the connection route between the treated water channel 43 and the drainage channel 44. By opening the connection route, the treated water W4 can be circulated from the treated water channel 43 to the drainage channel 44, and by closing the connection route, the treated water W4 stops being circulated from the treated water channel 43 to the drainage channel 44.

The reciprocating scraping machine 46*a* and the driving unit 46*b* are used to scrape the precipitate accumulated on the bottom of the precipitation unit 40 into the precipitate collecting unit 40*a*. In detail, the reciprocating scraping machine 46*a* includes a plurality of scrapers having a predetermined shape such as a wedge shape and has a structure extending toward the bottom of the filtering unit 41 from the precipitate collecting unit 40*a*. The driving unit 46*b* is connected with the reciprocating scraping machine 46a through a driving shaft, and the like and serves as a driving source of the reciprocating scraping machine 46a. The reciprocating scraping machine 46a reciprocates in an extension direction (see both bold-line arrow of FIG. 5) of the reciprocating scraping machine 46a by an action of the driving unit 46b while contacting the plurality of scrapers with the precipitate on the bottom of the precipitation unit 40. As a result, the reciprocating scraping machine 46a sequentially scrapes the precipitates on the bottom of the precipitation unit 40 in the precipitate collecting unit 40a.

The blowing device 47a, the air ejection pipe 47b, and the washing drainage channel 48 constitute the washing means for executing the washing function of the plurality of filtering media 42 packed in the filtering unit 41. The electric gate 45a closes the connection route between the treated water channel 43 and the drainage channel 44 and interrupts treated water circulation to the outside of the latter-stage solid-liquid separating apparatus 4 during a period when the washing function of the plurality of filtering media 42 is exhibited.

The blowing device 47a feeds air required to wash the plurality of filtering media 42 packed in the filtering unit 41 to the air ejection pipe 47b. The air ejection pipe 47b ejects air to the treated water W3 after the precipitation that flows into the filtering unit 41 to generate the swirl flow that agitatedly washes the plurality of filtering media 42 in the filtering unit 41. In detail, the air ejection pipe 47b is a porous pipe branched to correspond to a plurality of tanks constituting the filtering unit 41 as illustrated in FIG. 5. An air ejection port of the air ejection pipe 47b is placed on the bottom of the packed layer of the filtering medium 42 and around a side wall of the tank in each of the plurality of tanks. The air ejection pipe 47b ejects the air from the blowing device 47a upward from the lower layer thereof with respect to the packed layer of each filtering medium 42 to generate the vertical swirl flow in the treated water W3 of the filtering unit 41.

The washing drainage channel 48 is a drainage channel for discharging washing drainage water after agitatedly washing each filtering medium 42. In detail, as illustrated in FIG. 6, the washing drainage channel 48 is a channel of which the top is opened and forms a drainage route of washing drainage water on the top of the filtering unit 41 with a side wall higher than the treated water channel 43. The washing drainage channel 48 receives washing drainage water that overflows on the top of the filtering unit 41 from the screen 41a by the swirl flow described above, that is, the treated water W3 used to wash each filtering medium 42 and circulates the treated water W3 to the outside or the precipitation unit 40.

The control unit 49 controls an operation of each of the driving unit 45b of the electric gate 45a, the driving unit 46b of the reciprocating scraping machine 46a, and the blowing device 47a. In detail, the control unit 49 controls the driving unit 45b to open the connection route to the drainage channel 44 from the treated water channel 43 by an opening action of the electric gate 45a during a period when the treated water W3 in the precipitation unit 40 is filtered by the filtering unit 41. The control unit 49 controls the driving unit 45b to close the connection route to the drainage channel 44 from the treated water channel 43 by a closing action of the electric gate 45a during a period when the washing function of each filtering medium 42 in the filtering unit 41 is exhibited. During this period, the control unit 49 controls the blowing device 47a to feed air to the air ejection pipe 47b. Meanwhile, the control unit 49 controls the driving unit 46b to allow the reciprocating scraping machine 46a to reciprocate continuously or intermittently during a predetermined period.

Subsequently, referring to the flow of the treated water W3 and W4 marked with solid arrows of FIGS. 5 and 6, the solid-liquid separating treatment of the treated water W3 by the latter-stage solid-liquid separating apparatus 4 will be described. The treated water W3 is first circulated in the circulation pipe 32 of the trickling filter 3 described above and falls free into the precipitation unit 40.

As marked with the solid arrow of FIG. 5, the treated water W3 that flows into the precipitation unit 40 flows to the bottom of the filtering unit 41 from an inlet side (precipitate collecting unit 40a side) of the precipitation unit 40 by using inflow force when the treated water W3 falls free. During this period, the solid components such as the sludge in the treated water W3 are separated from the treated water W3 and precipitated on the bottom of the precipitation unit 40. The treated water W3 that overflows from the bottom of the filtering unit 41 is circulated in the precipitation unit 40 and finally, flows to the bottom of the filtering unit 41. Even in this case, the solid components in the treated water W3 are continuously precipitated and separated. As such, one of the solid-liquid separating treatments of the treated water W3 by the latter-stage solid-liquid separating apparatus 4, that is, the precipitation of the treated water W3 is achieved. The solid components that are precipitated on the bottom of the precipitation unit 40, that is, the precipitates separated from the treated water W3 are scraped into the precipitate collecting unit 40a by the reciprocating scraping machine 46a.

The treated water W3 after the precipitation described above reaches the bottom of the filtering unit 41 and thereafter, sequentially passes through the screen 41b and the filtering unit 41 upward, as marked with the solid arrow of FIG. 5. In this case, the treated water W3 after the precipitation passes through the voids of the plurality of filtering media 42 as the lower-speed flow than the filtering treatment of the solid-liquid separating apparatus 2 illustrated in FIG. 2. While the treated water W3 after the precipitation passes through the voids of the filtering media 42, the solid components in the treated water W3 are attached onto the surface of each filtering medium 42. By the attachment of the solid components to each filtering medium 42, the filtering unit 41 exhaustively catches the solid components such as the SS in the treated water W3 and separates the treated water W3 into the solid components and the treated water W4. As such, one of the solid-liquid separating treatments of the treated water W3 by the latter-stage solid-liquid separating apparatus 4, that is, the filtering of the treated water W3 is achieved.

The treated water W4 acquired by the solid-liquid separating treatment (precipitation and filtering) overflows on the top of the filtering unit 41 through the screen 41a as marked with the solid arrow of FIG. 5. Continuously, the treated water W4 flows into the treated water channel 43 and falls free into the drainage channel 44 from the treated water channel 43 as marked with the solid arrow of FIG. 6. Thereafter, the treated water W4 falls free in the drainage channel 44 and is discharged to an external environment.

Figure 7:
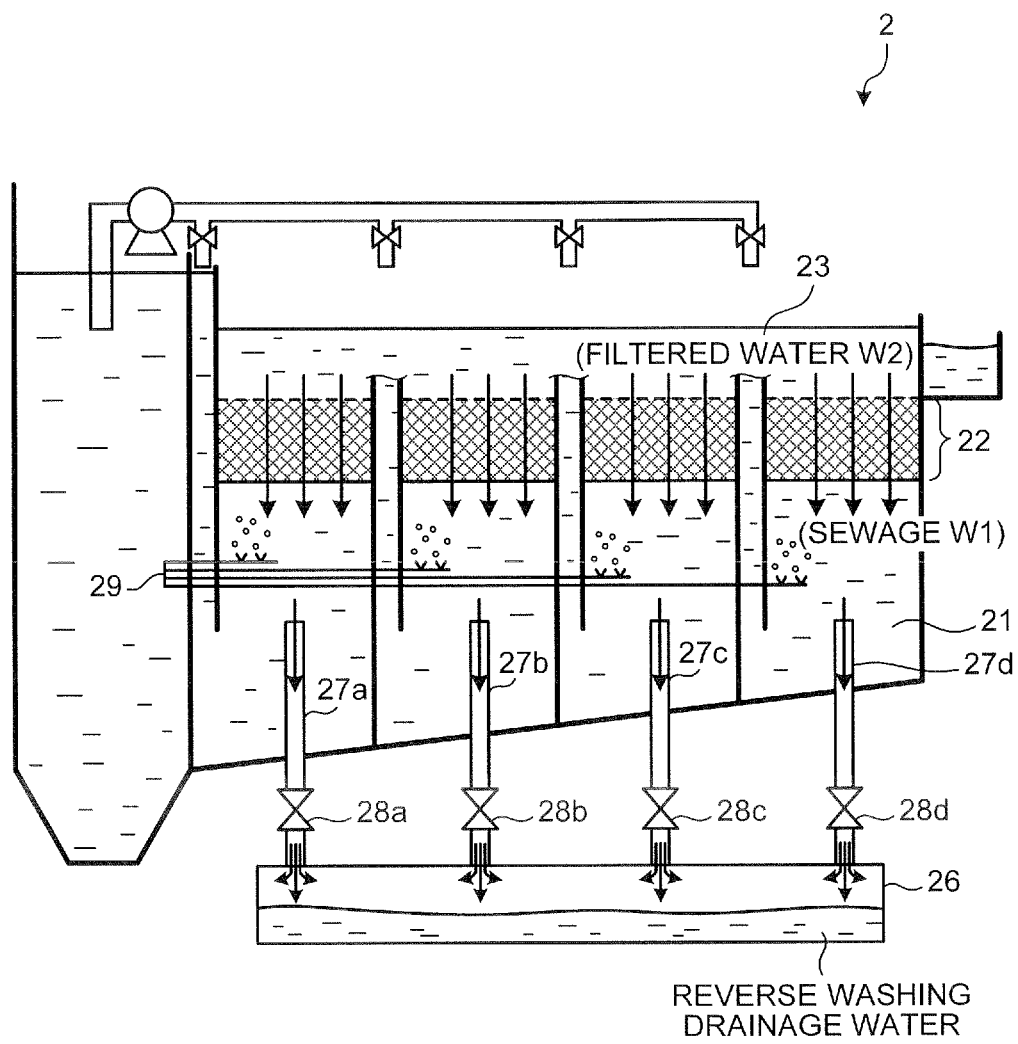
FIG. 7 is a schematic diagram illustrating a state in which the solid-liquid separating apparatus performs a reverse washing function.

Subsequently, the reverse washing function of the solid-liquid separating apparatus 2 described above will be described. FIG. 7 is a schematic diagram illustrating a state in which the solid-liquid separating apparatus executes the reverse washing function. In FIG. 7, a solid arrow indicates the flow of the liquid.

As illustrated in FIG. 7, the solid-liquid separating apparatus 2 allows the liquid to forcibly flow toward the filtering tank 21 on the bottom thereof from the common filtering tank 23 on the top thereof, and as a result, a reverse flow state to the general solid-liquid separating treatment is caused in the filtering medium packed layer 22 to reversely wash the filtering medium packed layer 22.

In detail, when the reverse washing function is effectuated, first, the drainage valves 28a to 28d are opened and the sewage W1 in each tank of the filtering tank 21 is guided to the drainage tank 26 through the drainage pipes 27a to 27d. Subsequently, after a predetermined time (for example, 10 to 30 seconds) has elapsed from the opening of the drainage valve, air flows into each tank of the filtering tank 21 from the air pipe 29 as illustrated in FIG. 7.

In this state, the filtered water W2 in the common filtering tank 23 passes through the filtering medium packed layer 22 downward, that is, flows backward. At the same time, the air pipe 29 ejects air toward each levitation filtering medium in the filtering medium packed layer 22 from the bottom of the filtering medium packed layer 22. By the synergy effect of the actions, each levitation filtering medium in the filtering medium packed layer 22 is scattered in the layer, and rotates or shakes, and as a result, the solid components such as fine particles or the SS on the surface of each levitation filtering medium are peeled off.

The solid components peeled off from the surface of each levitation filtering medium are circulated in the drainage pipes 27a to 27d to flow into the drainage tank 26 together with the sewage W1 in the filtering tank 21 or the filtered water W2 that flows backward in the filtering medium packed layer 22. The drainage tank 26 reserves the sewage W1 and the filtered water W2 including the solid components described above as reverse washing drainage water.

Herein, the levitation filtering medium in the filtering medium packed layer 22 has the apparent specific gravity in the range of 0.1 to 0.8 as described above. As a result, the levitation filtering medium just operates in the filtering medium packed layer 22 and does not leak from the filtering medium packed layer 22 even when the filtered water W2 flows backward from the top of the filtering medium packed layer 22.

By this configuration, the reverse washing function of the solid-liquid separating apparatus 2 is achieved. The solid-liquid separating apparatus 2 executes the reverse washing function at the predetermined timing. For example, the solid-liquid separating apparatus 2 may execute the reverse washing when filtering resistance of the filtering medium packed layer 22 is equal to or more than a predetermined threshold, may execute the reverse washing whenever a predetermined time has elapsed, or may execute the reverse washing by a combination thereof.

In this case, the solid-liquid separating apparatus 2 may include a measurement unit for measuring the filtering resistance of the filtering medium packed layer 22 and a control unit for controlling opening/closing of the drainage valves 28a to 28d based on a measurement result of the measurement unit or include a time measuring unit for measuring an elapsed time and a control unit for controlling opening/closing of the drainage valves 28a to 28d based on an output of the time measuring unit. The solid-liquid separating apparatus 2 may include the measurement unit, the time measuring unit, and the control unit described above.

Figure 8:
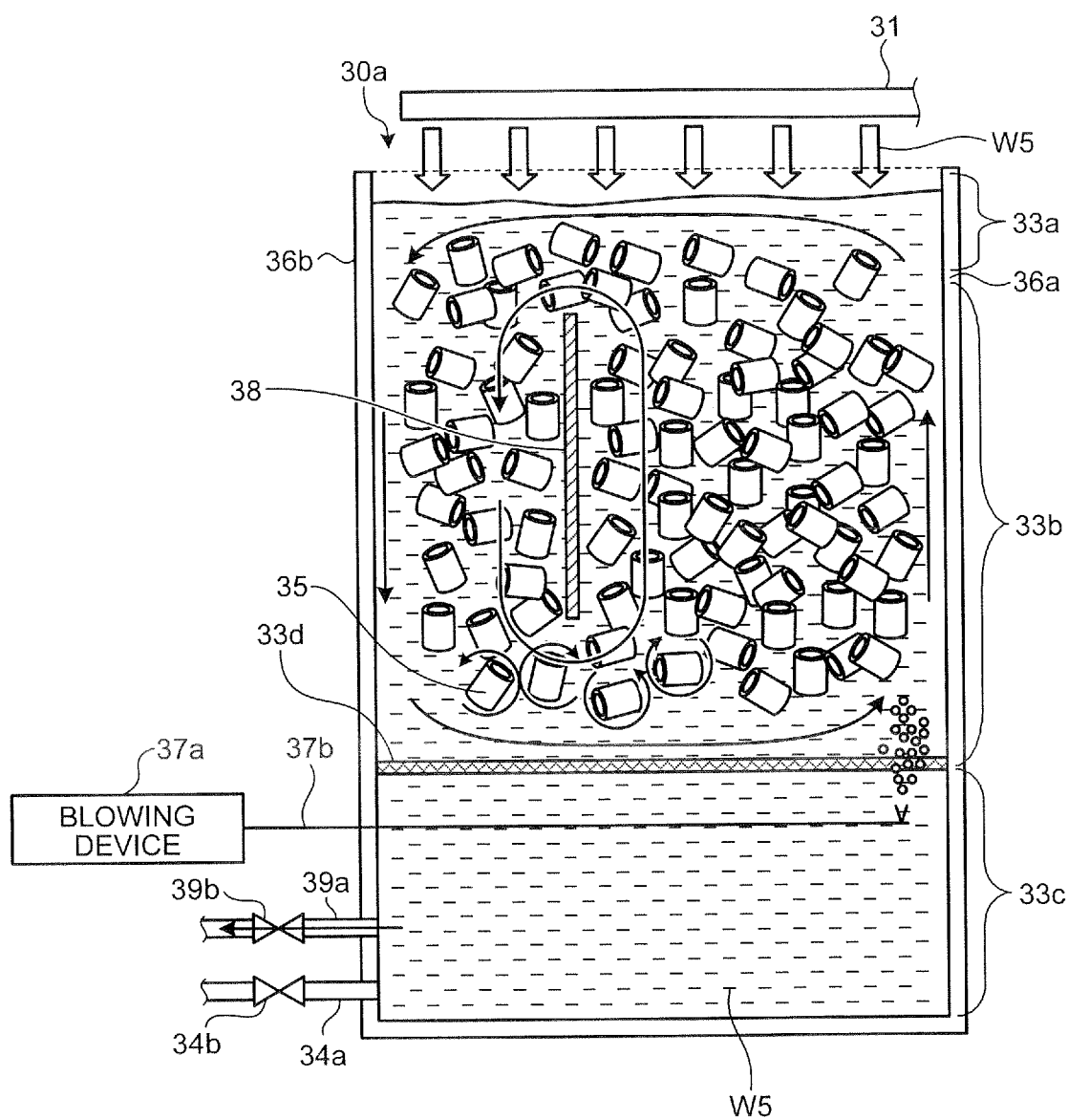
FIG. 8 is a schematic diagram illustrating a state in which the treatment tank constituting the trickling filter performs a washing function of a filtering medium packing layer.

Subsequently, the washing function of the filtering medium packed layer of the trickling filter 3 described above will be described. FIG. 8 is a schematic diagram illustrating a state in which the treatment tank constituting the trickling filter executes the washing function of the filtering medium packed layer. In FIG. 8, a solid arrow indicates the flow of the liquid. The washing function of the filtering medium packed layer of the trickling filter 3 is the same in the plurality of respective treatment tanks 30a to 30f (see FIG. 3) constituting the trickling filter 3. Hereinafter, a washing function of the filtering medium packed layer 33b of the treatment tank 30a illustrated in FIG. 4 will be representatively described as an example of the washing function of the trickling filter 3.

As illustrated in FIG. 8, the treatment tank 30a significantly reserves the washing liquid therein, forcibly agitates each filtering medium 35 in the filtering medium packed layer 33b by ejection of air from the lower layer 33c to the filtering medium packed layer 33b, and discharges the agitated washing liquid from the washing drainage pipe 39a to wash the filtering medium packed layer 33b.

In detail, when the washing function of the filtering medium packed layer 33b is effectuated, first, the valves 34b and 39b are closed and the discharge of the treated water W3 stops. Subsequently, washing water W5 which is the washing liquid of the filtering medium packed layer 33b flows into the treatment tank 30a from each trickling nozzle of the rotary trickling device 31 and the washing water W5 is reserved in the treatment tank 30a. The washing water W5 may flow into the treatment tank 30a from an upper opening of the treatment tank 30a without using the trickling nozzle.

The washing water W5 sequentially rises in the treatment tank 30a because the valves 34b and 39b are closed, and finally, allows the filtering medium packed layer 33b to at least submerge. That is, a liquid surface of the washing water W5 in the treatment tank 30a sequentially reaches the filtering medium packed layer 33b from the lower layer 33c, and as a result, the liquid surface reaches up to a height in the upper layer 33a.

When the liquid surface of the washing water W5 reaches the upper layer 33a of the treatment tank 30a, the supply of the washing water W5 to the treatment tank 30a stops and subsequently, the blowing device 37a feeds air to the air ejection pipe 37b. The air ejection pipe 37b ejects the air from the blowing device 37a to the washing water W5 in the treatment tank 30a, from the vicinity of the center wall 36a or the lower layer 33c of the treatment tank 30a as illustrated in FIG. 8. The air from the air ejection pipe 37b generates the swirl flow in which the washing water W5 swirls vertically around the baffle plate 38, as marked with the solid arrow of FIG. 8. That is, by the action of the ejected air, the washing water W5 flows upward in the center-side region of the treatment tank 30a and flows horizontally toward the circumference wall 36b from the center wall 36a on the upper layer 33a. The washing water W5 flows downward in the circumference-side region of the treatment tank 30a and flows horizontally toward the center wall 36a from the circumference wall 36b on the top of the filtering medium outflow preventing net 33d and the lower layers 33c. The swirl flow of the washing water W5 is formed by combining a series of flows.

Further, the generation of the swirl flow of the washing water W5 by the action of the ejected air described above is promoted by the baffle plate 38. That is, the baffle plate 38 interrupts flows other than the upward flow of the washing water W5 and changes the corresponding flows to the upward flows, in the center-side region of the treatment tank 30a, and as a result, the upward flow of the washing water W5 is enhanced. Simultaneously, the baffle plate 38 interrupts flows other than the downward flow of the washing water W5 and changes the corresponding flows to the downward flows, in the circumference-side region of the treatment tank 30a, and as a result, the downward flow of the washing water W5 is enhanced.

Incidentally, the center-side region and the circumference-side region in the treatment tank 30a are regions in the treatment tank 30a partitioned by the baffle plate 38 as described above. In detail, the center-side region as a region between the center wall 36a and the baffle plate 38 is an ejection region where air is ejected from the air ejection pipe 37b. The circumference-side region as a region between the circumference wall 36b and the baffle plate 38 is a non-ejection region where air is not ejected.

The washing water W5 of the swirl flow enhanced as described above agitatedly washes the plurality of filtering media 35 packed in the filtering medium packed layer 33b. In detail, the plurality of respective filtering media 35 are scattered by the swirl flow of the washing water W5 and forcibly swirls vertically around the baffle plate 38 together with the washing water W5, as marked with the solid arrow of FIG. 8. Simultaneously, the action of the washing water W5 causes each filtering medium 35 to forcibly rotate or shake. As a result, the biofilm attached onto the surface of each filtering medium 35, eggs and larvae of a filter fly, and attachments such as other garbage removed from the filtered water W2 are peeled off from the surface of each filtering medium 35 and float in the washing water W5 as washing garbage. The agitating and washing of each filtering medium 35 by the swirl flow of the washing water W5 are performed for a time enough to wash each filtering medium 35.

After each filtering medium 35 is agitated and washed, the washing drainage pipe 39a is opened by opening the valve 39b. The agitated and washed washing water W5 described above as the washing drainage water is discharged from the washing drainage pipe 39a to the outside through the filtering medium outflow preventing net 33d together with the washing garbage. Herein, the specific gravity of the filtering medium 35 is set to a value approximate to the specific gravity of water as described above. The filtering medium outflow preventing net 33d prevents the outflow of the filtering medium 35 to the lower layer 33c from the filtering medium packed layer 33b. As a result, the filtering medium 35 is reserved in the filtering medium packed layer 33b after the agitating and washing described above. The air supply of the blowing device 37a may be continued during a period when the agitated and washed washing water W5 is discharged or may stop at the time of opening the valve 39b.

As described above, the washing function of the filtering medium packed layer 33b of the treatment tank 30a is achieved. The treatment tank 30a may wash the filtering medium 35 when a water treatment capability of the filtering medium packed layer 33b deteriorates to a value equal to or less than a predetermined threshold, may wash the filtering medium 35 whenever a predetermined time has elapsed, or may wash the filtering medium 35 by a combination thereof. The washing function of each of the filtering media of the treatment tanks 30b to 30f illustrated in FIG. 3 is the same as the case of the treatment tank 30a described above.

Figure 9:
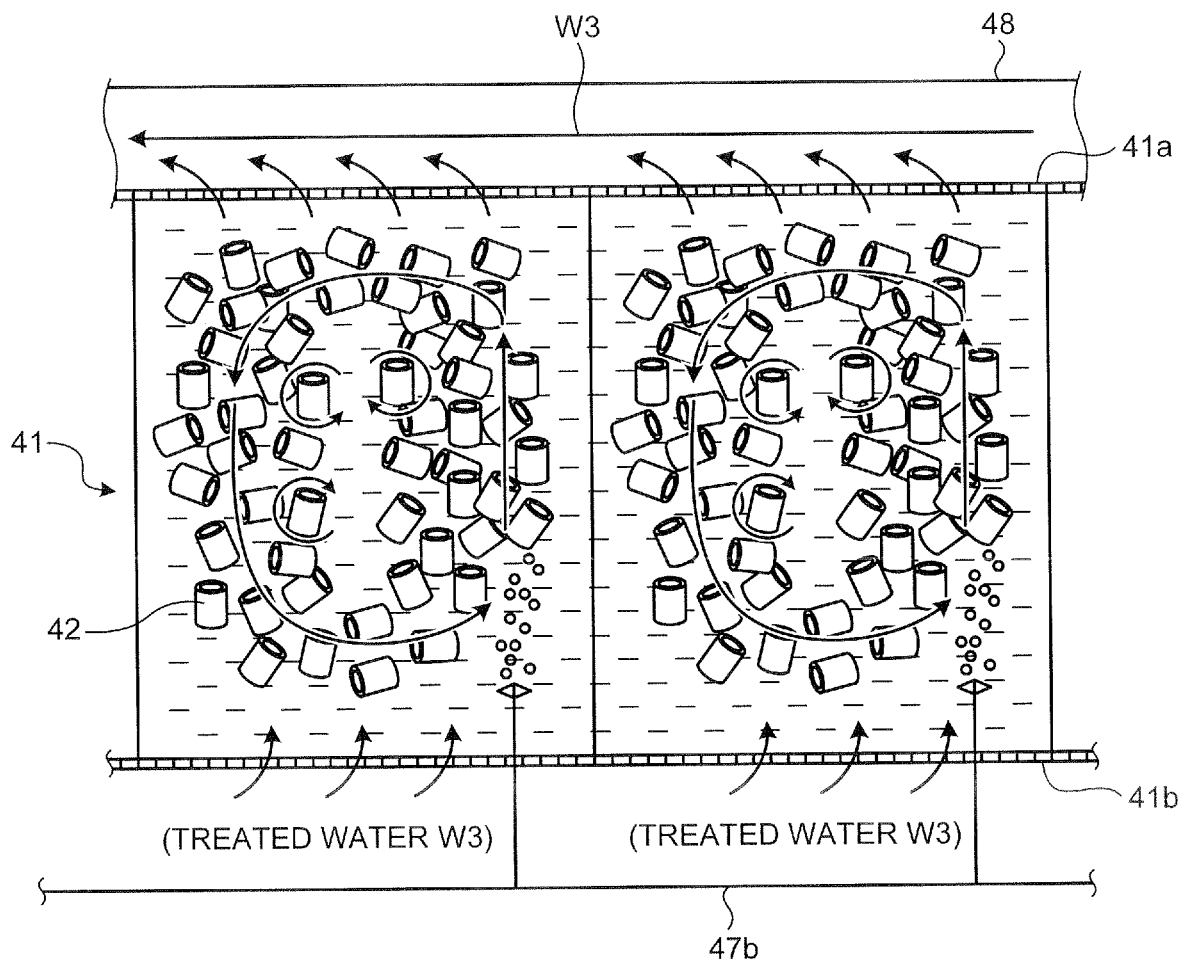
FIG. 9 is a schematic diagram describing the filtering medium washing function of the solid-liquid separating apparatus at the latter stage.

Subsequently, the filtering medium washing function of the latter-stage solid-liquid separating apparatus 4 described above will be described. FIG. 9 is a schematic diagram describing the filtering medium washing function of the latter-stage solid-liquid separating apparatus. In FIG. 9, a solid arrow indicates the flow of the liquid. Hereinafter, referring to FIGS. 5, 6, and 9 described above, the washing function of each filtering medium 42 of the filtering unit 41 by the latter-stage solid-liquid separating apparatus 4 will be described in detail.

The latter-stage solid-liquid separating apparatus 4 washes each filtering medium 42 in the filtering unit 41 by using the treated water W3 as a filtering medium washing liquid while continuing the flow of the treated water W3 into the precipitation unit 40 and scraping the precipitate in the precipitate collecting unit 40a.

In detail, when the filtering medium washing function of the filtering unit 41 is effectuated, first, the electric gate 45a is closed and the outflow of the treated water to the drainage channel 44 stops. In this state, each filtering medium 42 in the filtering unit 41 is submerged in the treated water W3.

Subsequently, the latter-stage solid-liquid separating apparatus 4 ejects air to the treated water W3 in the filtering unit 41 by using the blowing device 47a and the air ejection pipe 47b while continuing the flow of the treated water W3 into the filtering unit 41. That is, the blowing device 47a feeds air to the air ejection pipe 47b based on the control of the control unit 49. The air ejection pipe 47b ejects the air from the blowing device 47a to the treated water W3 in the filtering unit 41 from the vicinity of the side wall and the bottom of the filtering unit 41 as illustrated in FIG. 9.

The air from the air ejection pipe 47b generates the swirl flow in which the treated water W3 swirls vertically in the filtering unit 41 as marked with the solid arrow of FIG. 9. That is, by the action of the ejected air, the treated water W3 flows upward in the air ejection region in the filtering unit 41 and flows downward in the air non-ejection region in the filtering unit 41. As a result, the treated water W3 in the filtering unit 41 swirls around the center of each tank as a swirl center as illustrated in FIG. 9. The air ejection region is the region where the air is ejected from the air ejection pipe 47b and the air non-ejection region is the region where the air is not ejected.

The treated water W3 of the swirl flow as described above agitatedly washes the plurality of filtering media 42 packed in the filtering unit 41. In detail, the plurality of respective filtering media 35 are scattered by the swirl flow of the treated water W3 and forcibly swirls vertically together with the treated water W3 in the filtering unit 41, as marked with the solid arrow of FIG. 9. Simultaneously, the action of the treated water W3 causes each filtering medium 42 to forcibly rotate or shake. As a result, the attachments such as the SS which are attached onto the surface of each filtering medium 42 are easily peeled off from the surface of each filtering medium 42 and float in the treated water W3 as the washing garbage. The agitating and washing of each filtering medium 42 by the swirl flow of the treated water W3 are performed for a time enough to wash each filtering medium 42.

Further, during a period when each filtering medium 42 is agitated and washed described above, the treated water W3 sequentially and additionally flows into the filtering unit 41 from the bottom of the filtering unit 41 through the screen 41b, as illustrated in FIG. 9. The treated water W3 in the filtering unit 41 which has already been used to agitate and wash each filtering medium 42 overflows on the top of the filtering unit 41 through the screen 41a together with the washing garbage with the additional flow of the treated water W3 into the filtering unit 41. As such, the treated water W3 that overflows on the top of the filtering unit 41 flows into the washing drainage channel 48 together with the washing garbage. The washing drainage channel 48 forms a drainage channel which is different from the treated water channel 43 on the top of the filtering unit 41 as illustrated in FIG. 6. The washing drainage channel 48 circulates the treated water W3, which overflows on the top of the filtering unit 41 with the washing garbage as the washing drainage water, to an external tank (a garbage treating tank, and the like) of the latter-stage solid-liquid separating apparatus 4. The washing drainage channel 48 may circulate the washing drainage water to the precipitation unit 40.

After each filtering medium 42 is agitated and washed for a predetermined time as described above, the blowing device 47a stops feeding air to the air ejection pipe 47b based on the control of the control unit 49. As a result, the treated water W3 in the filtering unit 41 and the swirl flow of each filtering medium 42 are attenuated and finally, the swirl flow stops. The control unit 49 keeps a closing state of the electric gate 45a by controlling the driving unit 45b until a predetermined time has elapsed after the swirl flow stops. Therefore, the control unit 49 suppresses the outflow of the treated water to the drainage channel 44 until the concentration of the washing garbage (for example, the concentration of the SS) in the treated water W3 that overflows on the top of the filtering unit 41 is stably decreased to a predetermined value or less. The control unit 49 controls the driving unit 45b to open the electric gate 45a at the timing when the concentration of the washing garbage in the treated water W3 is stably decreased to the predetermined value or less.

By this configuration, the washing function of each filtering medium 42 in the filtering unit 41 is achieved. The latter-stage solid-liquid separating apparatus 4 may wash the filtering medium 42 when a water level of the precipitation unit 40 is increased to a predetermined level or more, may wash the filtering medium 42 whenever a predetermined time has elapsed, or may wash the filtering medium 42 by a combination thereof.

As described above, in the first embodiment of the present invention, in the sewage treatment system by the trickling filter method, the solid-liquid separating apparatus is installed on the former stage of the trickling filter instead of the first precipitation basin in the related art and the solid-liquid separating apparatus catches the solid components such as the SS and the solid BOD in the sewage to be treated. As a result, before the liquid to be treated flows into the trickling filter, the solid components originally included in the liquid to be treated may be exhaustively removed. Therefore, on the former stage of the trickling filter, the sewage to be treated can be exhaustively solid-liquid separated into the solid components and a filtered water and most of organic materials in the acquired filtered water become dissolved organic materials. Accordingly, the miniaturization of the trickling filter can be promoted because the load of the organic material to the trickling filter on the latter-stage is reduced, and as a result, the sewage treatment system by the trickling filter method can be installed in a space much smaller than the first precipitation basin and a space for installing the system can be saved. A trickling nozzle that trickles the liquid to be treated to the trickling filter can be prevented from being clogged.

Further, since the solid components in the liquid to be treated are removed by the solid-liquid separating apparatus on the former stage of the trickling filter, the sewage treatment system by the trickling filter method can be constructed, which is more compact than the case in which the solid-liquid separating treatment is not performed on the former stage of the trickling filter. As a result, the sewage treatment system can be implemented, which is more easily maintained than the standard activated sludge method and has a water purifying capability equal to or more than the standard activated sludge method, and the space for installing the system can be saved.

In addition, since the SS and the solid BOD in the liquid to be treated are removed by the solid-liquid separating apparatus on the former stage of the trickling filter, bad smell from the filtering medium packed layer of the trickling filter can be suppressed. Since the washing function of the filtering medium packed layer is added to the trickling filter, each filtering medium in the trickling filter can be washed at a desired timing. Therefore, corruption of the filtering medium packed layer of the trickling filter and attachment of eggs or larvae of insects to the trickling filter can be suppressed, and as a result, the bad smell from the trickling filter can be further suppressed and generation of the filter flies can be prevented.

Further, the latter-stage solid-liquid separating apparatus is installed on the latter stage of the trickling filter, and the latter-stage solid-liquid separating apparatus performs precipitation and low-speed filtering of the treated water from the trickling filter. As a result, the solid components such as the sludge can be precipitated and separated from the treated water from the trickling filter and the solid components such as the SS can be caught and removed from the treated water after the precipitation. Therefore, the removal rate of the solid components (in particular, the SS) in the treated water can be improved as possible, and as a result, treated water which is more transparent and clean can be discharged to the external environment.

In addition, as the filtering media of the trickling filter and the filtering unit of the latter-stage solid-liquid separating apparatus, the cylindrical filtering media are used. As a result, the filtering media can be easily fabricated, and a contact area between an object to be treated in water treatment and the medium surface and the void ratio of the filtering medium packed layer can be increased as possible. As a result, a cost required for the filtering media can be reduced, and water treatment efficiency of each of the trickling filter and the latter-stage solid-liquid separating apparatus can be improved.

Further, in the latter-stage solid-liquid separating apparatus, since the filtering unit is installed in the precipitation unit, the miniaturization of the latter-stage solid-liquid separating apparatus can be promoted. Therefore, the miniaturization of the sewage treatment system by the trickling filter method can contribute to saving the space for installing the system. An object to be filtered flows free into the filtering unit by using the inflow force of the object to be treated that flows into the precipitation unit. An inflow pump of the object to be filtered need not be installed in the filtering unit, and as a result, the latter-stage solid-liquid separating apparatus can be simply configured, and a manufacturing cost and an installation cost of the latter-stage solid-liquid separating apparatus can be reduced as possible.

In addition, since the reserved water (the treated water W3 described above) in the precipitation unit is used as the washing liquid of the filtering unit of the latter-stage solid-liquid separating apparatus, the washing liquid for washing the filtering unit need not be additionally prepared and the filtering unit can be washed while continuing the flow of the object to be treated in the precipitation unit. Therefore, as a facility for washing the filtering unit, such as the inflow pump of the washing liquid becomes unnecessary and the filtering unit can be washed while continuing the precipitation of the object to be treated in the precipitation unit. As a result, a cost required for washing the filtering unit can be reduced as possible, and precipitation efficiency of the object to be treated can be maintained to be high even at the time of washing the filtering unit.

Further, air is ejected to the washing liquid in which each filtering medium is submerged, and as a result, the swirl flow is generated in the washing liquid and each filtering medium is agitated and washed by the swirl flow. Therefore, the attachments such as the SS can be easily removed from the surface of each filtering medium.

The advantages are that one embodiment of the present invention provides a sewage treatment system by the trickling filter method, the occurrence of the bad smell and the filtering flies from the trickling filter can be suppressed, the trickling nozzle clogging can be prevented, and a space for installing the system can be saved.

Subsequently, a second embodiment of the present invention will be described. In the second embodiment, a biofilm filtering apparatus is installed on a latter stage of the trickling filter 3 in the first embodiment described above and the treated water W3 from the trickling filter 3 is biotreated by the biofilm filtering apparatus.

Figure 10:
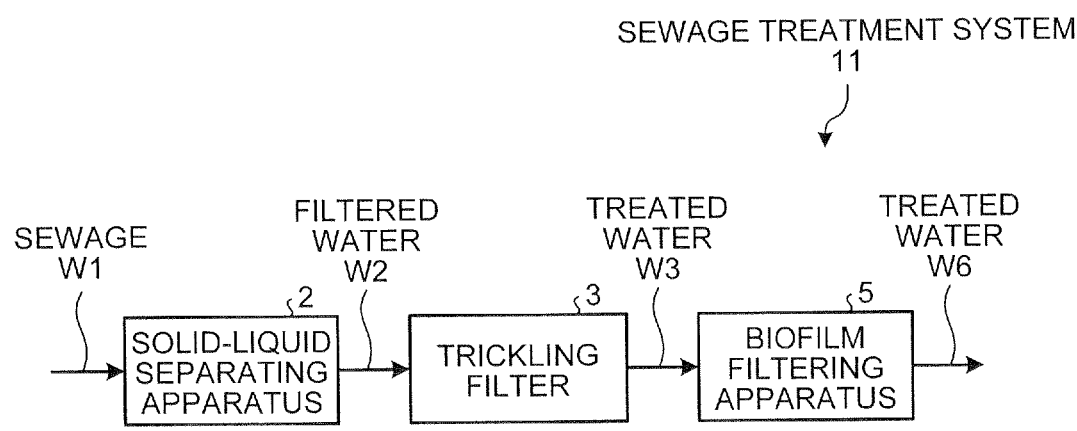
FIG. 10 is a block diagram illustrating a schematic configuration of a sewage treatment system according to a second embodiment of the present invention.

FIG. 10 is a block diagram illustrating a schematic configuration of a sewage treatment system according to a second embodiment of the present invention. As illustrated in FIG. 10, a sewage treatment system 11 according to the second embodiment includes a biofilm filtering apparatus 5 instead of the latter-stage solid-liquid separating apparatus 4 of the sewage treatment system 1 according to the first embodiment. Other components are the same as those of the first embodiment and the same reference numerals refer to the same components.

The biofilm filtering apparatus 5 is used to perform the third-step purifying treatment of the sewage W1 to be treated in the second embodiment. In detail, the biofilm filtering apparatus 5 is installed on the latter-stage of the trickling filter 3 and receives the treated water W3 acquired by the trickling filter 3. Subsequently, the biofilm filtering apparatus 5 further biotreats the treated water W3 to acquire treated water W6. Thereafter, the biofilm filtering apparatus 5 discharges the treated water W6 to an external environment such as a river or a pond.

Subsequently, the biofilm filtering apparatus 5 in the second embodiment will be described in detail. Herein, first, a configuration of the biofilm filtering apparatus 5 will be described and thereafter, biotreatment (filtering treatment) of the treated water W3 using the biofilm filtering apparatus 5 will be described.

Figure 11:
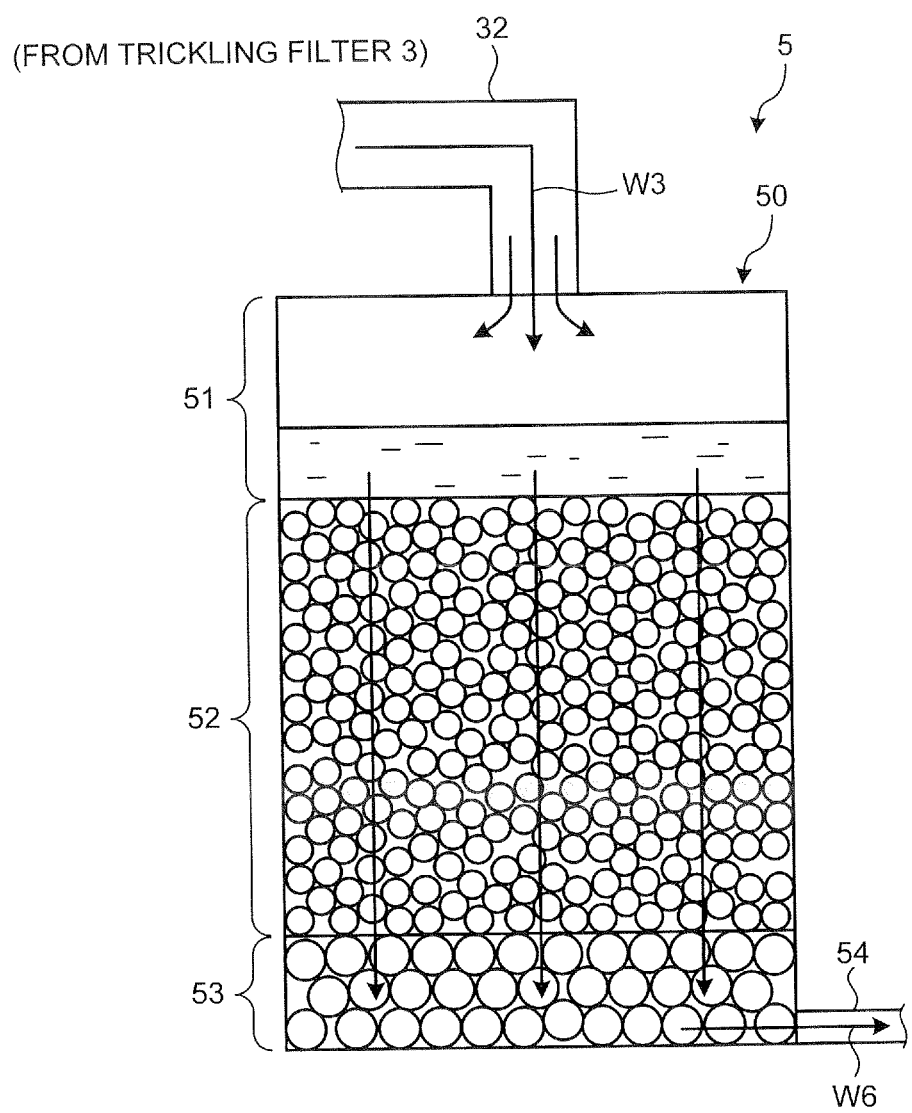
FIG. 11 is a schematic diagram illustrating a configuration example of a biofilm filtering apparatus of the sewage treatment system according to the second embodiment of the present invention.

FIG. 11 is a schematic diagram illustrating a configuration example of the biofilm filtering apparatus of the sewage treatment system according to the second embodiment of the present invention. As illustrated in FIG. 11, the biofilm filtering apparatus 5 includes a biotreatment tank 50 for receiving the treated water W3 from the trickling filter 3 and biotreating the received treated water W3 and a drainage pipe 54 for discharging the treated water W6 acquired by the biotreatment.

The biotreatment tank 50 includes an upper layer 51, a biofilm filtration layer 52 for biotreating the treated water W3 from the trickling filter 3, and a support gravel layer 53 for supporting the biofilm filtration layer 52. The circulation pipe 32 of the trickling filter 3 is connected to the upper layer 51 of the biotreatment tank 50 and the biotreatment tank 50 is connected with the circulation pipe 32. The biotreatment tank 50 receives the treated water W3 that flows through the circulation pipe 32 in the upper layer 51.

The biofilm filtration layer 52 is used to biotreat the treated water W3 acquired by using the trickling filter 3. The filtering medium is packed in the biofilm filtration layer 52 while the void is formed between the filtering media so that the treated water W3 trickled into the upper layer 51 falls free.

Herein, an aerobic microorganism is at least attached onto the surface of the filtering medium packed in the biofilm filtration layer 52. The filtering medium in the biofilm filtration layer 52 has a shape in which a contact area between the treated water W3 that falls free in the biofilm filtration layer 52 and the medium surface is increased.

The support gravel layer 53 is a layer in which gravels having a size larger than that of the filtering medium in the biofilm filtration layer 52 are packed. The support gravel layer 53 supports the biofilm filtration layer 52 from the bottom and allows the treated water W6 that falls free from the biofilm filtration layer 52 to flow downward.

The drainage pipe 54 is used to discharge the clear treated water W6 acquired by biotreating the treated water W3 by the biofilm filtration layer 52 to the external environment such as the river or pond. In detail, the drainage pipe 54 is placed downstream of the support gravel layer 53 as the bottom of the biotreatment tank 50 and is connected with the support gravel layer 53. The drainage pipe 54 discharges the treated water W4 that falls free from the support gravel layer 53 to the external environment.

Subsequently, referring to the flow of the treated water W3 and W4 marked with solid arrows of FIG. 11, the biotreatment of the treated water W3 by the biofilm filtering apparatus 5 will be described. The treated water W3 is first circulated in the circulation pipe 32 of the trickling filter 3 described above and falls free into the upper layer 51 of the biotreatment tank 50.

The treated water W3 that flows into the upper layer 51 falls free in the biofilm filtration layer 52. The treated water W3 that flows into the biofilm filtration layer 52 falls free while sequentially contacting the surface of each filtering medium in the biofilm filtration layer 52 and is continuously biotreated by the microorganism whenever contacting the surface of the filtering medium.

Herein, since the treated water W3 that passes through the biofilm filtration layer 52 is treated water acquired while being biotreated with being ventilated by the trickling filter 3 described above, dissolved oxygen (DO) is maintained to for example, a high value in the range of 4 to 8 [mg/l]. As a result, the biotreatment tank 50 need not perform aeration treatment to supply oxygen to the biofilm (in particular, the aerobic microorganism) at the time of biotreating the treated water W3. That is, the biotreatment tank 50 allows the treated water W3 which is in a non-aeration state to pass through the biofilm filtration layer 52 without performing the aeration treatment of the treated water W3. Therefore, the aerobic microorganism in the biofilm filtration layer 52 can biotreat the treated water W3 which is in the non-aeration state.

The biofilm filtration layer 52 biotreats the treated water W3 having high DO under a non-aeration environment as described above, and as a result, an organic material (for example, an organic contamination material, and the like) in the treated water W3 is dissolved, and the SS in the treated water W3 is caught and removed. Therefore, the biotreatment of the treated water W3 by the biofilm filtering apparatus 5 is achieved.

Thereafter, the biofilm filtration layer 52 allows the treated water W6 acquired by biotreating the treated water W3 as described above to flow out free to the support gravel layer 53 downstream. The treated water W6 that reaches the support gravel layer 53 flows toward the opening of the drainage pipe 54 while falling free in the support gravel layer 53. Thereafter, the treated water W6 falls free in the drainage pipe 54 and is discharged to the external environment. The treated water W6 is high in transparency and clearness similarly to the treated water W4 in the first embodiment described above.

As described above, in the second embodiment of the present invention, the biofilm filtering apparatus is placed on the latter stage of the trickling filter instead of the latter-stage solid-liquid separating apparatus and the biofilm filtering apparatus is configured to biotreat the treated water by the trickling filter, and the rest of the components are configured similarly to those of the first embodiment. As a result, the substantially same action effect as the case of the first embodiment is enjoyed and the treated water having high DO can be supplied to the biofilm filtering apparatus. Therefore, the biofilm filtering apparatus need not perform aeration treatment of the treated water from the trickling filter and can biotreat the treated water under the non-aeration environment. Accordingly, the organic contamination material and the SS included in the treated water from the trickling filter can be caught and removed, and as a result, the treated water which is high in transparency and clearness can be discharged to the external environment similarly to the case of the first embodiment.

Modified Example

Figure 12:
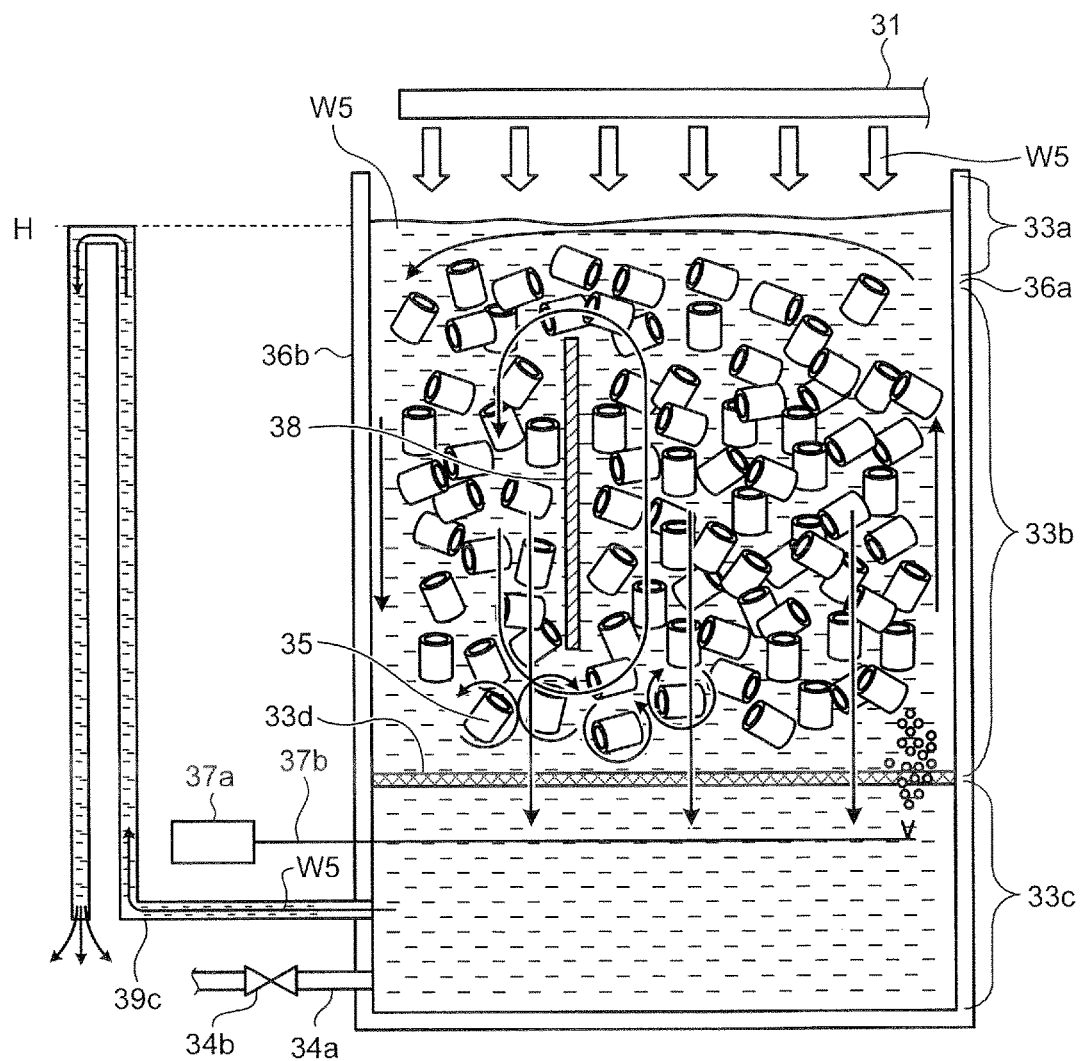
FIG. 12 is a schematic diagram illustrating a modified example of a trickling filter in the present invention.
Figure 13:
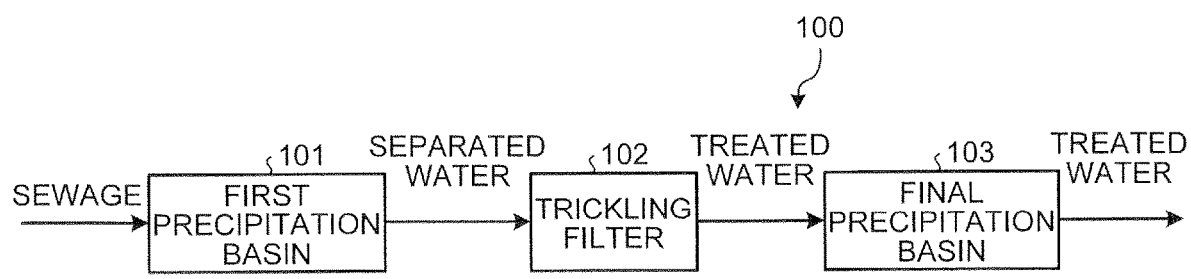
FIG. 13 is a block diagram illustrating a schematic configuration of a sewage treatment system by a trickling filter method in the related art.

Subsequently, a modified example of the trickling filter 3 will be described. The trickling filter 3 in the first and second embodiments of the present invention allows the washing drainage water to flows out free from the washing drainage pipe opened by the valve, but in the modified example of the trickling filter 3, the trickling filter allows the washing drainage water to be discharged by using a siphon principle. FIG. 12 is a schematic diagram illustrating a modified example of the trickling filter in the present invention. As illustrated in FIG. 12, the trickling filter according to the modified example includes a washing drainage pipe 39c instead of the washing drainage pipe 39a and the valve 39b in the first and second embodiments. Other components are the same as those of the first and second embodiments and the same reference numerals refer to the same components.

That is, a filter body of the trickling filter according to the modified example is constituted by the plurality of treatment tanks 30a to 30f similarly to the first and second embodiments, but in the modified example, each of the treatment tanks 30a to 30f includes the washing drainage pipe 39c instead of the washing drainage pipe 39a and the valve 39b. In FIG. 12, the treatment tank 30a among the plurality of treatment tanks 30a to 30f is illustrated, but in the modified example, the configurations and functions (a water treatment function and a filtering medium washing function) of the treatment tank 30a are the same as those of the rest of the treatment tanks 30a to 30f. The water treatment function of the treatment tank 30a is the same as that of the first and second embodiments. Hereinafter, referring to FIG. 12, the configuration and the washing function of the treatment tank 30a will be representatively described.

As illustrated in FIG. 12, the treatment tank 30a in the modified example includes, as the washing means for executing the washing function of the filtering medium packed layer 33b, the valve 34b, the blowing device 37a, the air ejection pipe 37b, the baffle plate 38, and the washing drainage pipe 39c that are the same as those of the first embodiment. Other components are the same as those of the first and second embodiments as described above.

The washing drainage pipe 39c is a drainage pipe having a cross-sectional shape such as the letter D or the letter U. A return position of a circulation route in the washing drainage pipe 39c is formed on the upper layer 33a of the treatment tank 30a and a drainage port of the washing drainage pipe 39c is formed on the lower layer 33c, as illustrated in FIG. 12. The washing drainage pipe 39c circulates the washing liquid in the treatment tank 30a therein to discharge the washing liquid to the outside by the siphon principle when the washing liquid is reserved in the treatment tank 30a up to a height of an apex of the return position as described below.

During a period when the treated water W3 is acquired by biotreating the filtered water W2 from the solid-liquid separating apparatus 2, the valve 34b is opened. As a result, the treated water W3 falls to the lower layer 33c and thereafter, directly flows into the circulation pipe 34a. As a result, when the filtered water W2 is biotreated, the treated water W3 is not almost accumulated up to the height of the top of the filtering medium packed layer 33b and of course, the treated water W3 is never accumulated up to the height of the apex of the return position of the washing drainage pipe 39c.

Subsequently, as an example of the washing function of the trickling filter according to the modified example, the washing function of the filtering medium packed layer 33b of the treatment tank 30a will be described. Except the washing function of the filtering medium packed layer 33b in the modified example generates the downward stream of the washing water W5 by using the siphon principle and discharges the washing drainage water from the washing drainage pipe 39c, the modified example is the same as the first and second embodiments. Hereinafter, referring to FIG. 12, differences between the modified example, and the first and second embodiments associated with the washing function will be described. In FIG. 12, a solid arrow indicates the flow of the liquid.

As illustrated in FIG. 12, the treatment tank 30a sequentially receives the washing water W5 that falls free from each trickling nozzle of the rotary trickling device 31 while forcibly agitating each filtering medium 35 by ejecting air from the lower layer 33c by the air ejection pipe 37b. The washing water W5 in the treatment tank 30a sequentially rises by additional inflow of new washing water W5 while causing the swirl flow by the air ejected from the air ejection pipe 37b. In this state, the liquid surface of the washing water W5 in the treatment tank 30a reaches a portion above the filtering medium packed layer 33b, and as a result, the liquid surface reaches up to the height of the upper layer 33a.

With the inflow of the washing water W5, the washing water W5 flows into the washing drainage pipe 39c as illustrated in FIG. 12. In this case, the liquid surface of the washing water W5 that flows into the washing drainage pipe 39c has the substantially same height as that of the liquid surface of the washing water W5 in the treatment tank 30a.

Thereafter, the liquid surface of the washing water W5 in the washing drainage pipe 39c is increased with the flow of the washing water W5 in the treatment tank 30a and finally, the liquid surface reaches the height H of the apex of the return position of the washing drainage pipe 39c. In this case, as illustrated in FIG. 12, the liquid surface of the washing water W5 in the treatment tank 30a reaches the height H.

In this state, the washing water W5 is discharged from the drainage port of the washing drainage pipe 39c as marked with the solid arrow of FIG. 12 according to the siphon principle using the washing drainage pipe 39c. With this, the washing water W5 in the treatment tank 30a is forcibly discharged through the washing drainage pipe 39c after passing through the filtering medium outflow preventing net 33d. A forcible discharge phenomenon of the washing water W5 forcibly generates the downward stream in the washing water W5 which swirls in the treatment tank 30a. That is, both the swirl flow by the air ejection and the downward stream by the siphon principle are simultaneously generated in the washing water W5 of the treatment tank 30a. The washing water W5 in the treatment tank 30a agitates and washes each filtering medium 35 more strongly by the synergy action between the swirl flow and the downward stream. As a result, the biofilm attached onto the surface of each filtering medium 35, eggs and larvae of a filter fly, and attachments such as other garbage removed from the filtered water W2 are more reliably peeled off from the surface of each filtering medium 35 and float in the washing water W5 as washing garbage.

The agitated and washed washing water W5 described above as the washing drainage water is discharged from the washing drainage pipe 39c to the outside through the filtering medium outflow preventing net 33d together with the washing garbage. Meanwhile, the filtering medium 35 is reserved in the filtering medium packed layer 33b after the agitating and washing by an action of the filtering medium outflow preventing net 33d even when the washing water W5 is discharged from the drainage port of the washing drainage pipe 39c according to the siphon principle as described above. Therefore, the filtering medium 35 does not flow into the washing drainage pipe 39c. As described above, the washing function of the filtering medium packed layer 33b in the modified example is achieved.

As described above, in the modified example, a siphon pipe is used as the washing drainage pipe among the washing means of each filtering medium and the washing drainage water is discharged as well as water circulation of the agitating and washing of each filtering medium is enhanced by using the siphon principle, and other components are configured similarly to the first and second embodiments. Therefore, the downward stream by the siphon principle is added to the swirl flow of the washing water as well as the same action effect as the cases of the first and second embodiments is enjoyed to increase agitation force of each medium, and as a result, a filtering medium washing capability is increased and each filtering medium may be washed more significantly.

Further, in the first and second embodiments and the modified example, the latter-stage solid-liquid separating apparatus 4 or the biofilm filtering apparatus 5 is installed on the latter stage of the trickling filter 3, but the present invention is not limited thereto and a solid-liquid separating apparatus (for example, a solid-liquid separating apparatus without a filtration layer in the precipitation unit) other than the latter-stage solid-liquid separating apparatus 4 may be provided on the latter stage of the trickling filter 3, a biofilm filtering apparatus (for example, an aeration type biofilm filtering apparatus) may be installed, which is other than the biofilm filtering apparatus 5, and a general final precipitation basin may be installed.

Alternatively, the treated water by the trickling filter 3 may be discharged to the external environment without installing a water purifying facility on the latter stage of the trickling filter by using the trickling filter 3 as a final water purifying means. The treated water W3 by the trickling filter 3 described above is lower in transparency than the treated water W4 by the latter-stage solid-liquid separating apparatus 4 or the treated water W6 by the biofilm filtering apparatus 5, but the treated water W3 is purified not to cause an environmental problem even though the treated water W3 flows out to the external environment.

Further, in the first and second embodiments, and the modified example, the sewage treatment system using the trickling filter having the washing function of the filtering medium packed layer has been described, but the present invention is not limited thereto and a sewage treatment system using a trickling filter without the washing function of the filtering medium packed layer may be used.

In addition, in the first and second embodiments, and the modified example, the washing water W5 has been used in order to wash the filtering medium packed layer 33b of the trickling filter 3, but the present invention is not limited thereto and the filtered water W2 treated by the solid-liquid separating apparatus 2 flows into the treatment tank 30a and the filtering medium packed layer 33b may be washed by using the filtered water W2. This is applied to the rest of the treatment tanks 30b to 30f similarly.

Further, in the first and second embodiments, and the modified example, the sewage W1 has been circulated by actuating the pump 24e in the solid-liquid separating apparatus 2, but the present invention is not limited thereto and the pump 24e may not be used. That is, the sewage W1 may naturally flow into the distribution tank 20 or the filtering tank 21 by using a difference in height (potential energy) without using the power of the pump, and the like.

In addition, in the second embodiment described above, the treated water W3 has fallen free from the top of the biofilm filtering apparatus 5, but the present invention is not limited thereto and the treated water W3 may flow in from the side of the biofilm filtering apparatus 5 and the treated water W3 may flow in from the bottom of the biofilm filtering apparatus 5 by placing the biofilm filtration layer 52 on the top of the biotreatment tank 50. Even in any case, the treated water W3 has only to flow into the biofilm filtration layer 52 under the non-aeration environment.

Further, in the first and second embodiments, and the modified example, the filtering tank 21 of the solid-liquid separating apparatus 2 is divided into four regions, but the present invention is not limited thereto and the solid-liquid separating apparatus 2 has only to be a filtering tank having one or more tanks for the sewage W1 to pass through the filtering medium packed layer 22 upward.

In addition, in the first and second embodiments, and the modified example, as the filtering medium of the trickling filter or the latter-stage solid-liquid separating apparatus, the cylindrical filtering medium has been used, but the present invention is not limited thereto and the shape of the filtering medium may be a desired shape such as a polygonal shape or a cross shape if the shape increases the contact area between the filtering medium and the object to be treated.

Further, in the modified example, each filtering medium has been agitated and washed by combining the swirl flow by the ejected air and the downward stream by the siphon principle at the time of washing each filtering medium of the trickling filter, but the present invention is not limited thereto and each filtering medium may be agitated and washed by using the downward stream by the siphon principle without using the swirl flow by the ejected air. In this case, the air supply means such as the blowing device and the air ejection pipe, and the baffle plate may not be installed in the trickling filter. The treated water W3 by the trickling filter may flow out by the siphon principle. In this case, the siphon pipe is provided instead of the circulation pipe 34a and the treated water W3 may flow out from the siphon pipe and the washing drainage pipe 39c may be used as the siphon pipe.

In addition, in the first and second embodiments, and the modified example, the trickling filter 3 including the filter body 30 formed by combining the six treatment tanks 30a to 30f has been described, but the number of treatment tanks constituting the filter body 30 is not limited to six. That is, the filter body 30 may be configured by a single treatment tank or a plurality of treatment tanks.

Further, in the first and second embodiments, and the modified example, the baffle plate has been placed in each treatment tank of the trickling filter, but the present invention is not limited thereto and the swirl flow may be generated in the washing liquid by only air ejection without placing the baffle plate in the trickling filter. In this case, it may be determined whether the baffle plate is placed in the trickling filter according to the filtering medium washing capability required for the trickling filter.

In addition, in the first embodiment, the filtering unit 41 of the latter-stage solid-liquid separating apparatus 4 has been divided into the plurality of tanks, but the present invention is not limited thereto and the filtering unit 41 may be the single tank. That is, in the present invention, the number of tanks of the filtering unit 41 is not particularly limited.

Further, in the first embodiment, the precipitates in the precipitation unit 40 of the latter-stage solid-liquid separating apparatus 4 has been scraped to the precipitate collecting unit 40a by the reciprocating scraping machine 46a, but the present invention is not limited thereto. That is, if the precipitates may be collected in the precipitate collecting unit 40a, a device other than the reciprocating machine, such as a chain flight type scraping machine may be used.

Further, the present invention is not limited to the first and second embodiments, and the modified example described above and a configuration acquired by appropriately combining the respective components described above is also included in the present invention. Besides, other embodiments, examples, and operating techniques implemented by those skilled in the art based on the first and second embodiments, and the modified example described above are all included in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A trickling filter, comprising:
   a treatment tank including a filtering media packed layer packed with filtering media to which microorganisms are attached and a support member placed at the bottom of the filtering media packed layer configured to support the filtering media;
   a rotary trickling device configured to trickle water to be treated onto the filtering media packed layer;
   a partition plate, which has a lower end, positioned in a vertical direction in the filtering media packed layer and configured to partition the filtering media packed layer into a first region and a second region, with the filtering media being in both the first region and the second region, and
   an air ejection pipe configured to eject air to one of the first region and the second region,
   wherein a distance of a space between the support member and the lower end of the partition plate in the vertical direction in the filtering media packed layer is larger than a maximum dimension of the filtering media such that the filtering media is in the first and second regions and is under the lower end of the partition plate in the space between the support member and the lower end of the partition plate.

2. The trickling filter according to claim 1, wherein the support member is configured to pass the water treated by the microorganisms and washing liquid for washing the filtering media, but not pass the filtering media from the filtering media packed layer.

3. The trickling filter according to claim 2, wherein the support member is a net.

4. The trickling filter according to claim 1, wherein the filtering media is in a shape of a cylinder, the maximum dimension is the height of the cylinder.

5. The trickling filter according to claim 1, wherein the treatment tank further comprises a lower layer under the support member, into which the water treated by the microorganisms and the washing liquid flows, and in which the air ejection pipe extends in a horizontal direction.

6. The trickling filter according to claim 5, wherein the treatment tank further comprises a first discharge pipe configured to discharge the washing liquid, and a first valve configured to open or close the first discharge pipe, wherein the first discharge pipe communicates with the lower layer.

7. The trickling filter according to claim 6, wherein the treatment tank further comprises a second discharge pipe configured to discharge the water treated by the microorganisms, and a second valve configured to open or close the second discharge pipe, wherein the second discharge pipe communicates with the lower layer.

8. A wash unit to wash filtering media packed in a trickling filter, wherein the trickling filter comprises:
   a treatment tank including a filtering media packed layer packed with filtering media to which microorganisms are attached and a support member placed at the bottom of the filtering media packed layer configured to support the filtering media;
   a rotary trickling device configured to trickle water to be treated onto the filtering media packed layer;
   a partition plate, which has a lower end, positioned in a vertical direction in the filtering media packed layer and configured to partition the filtering media packed layer into a first region and a second region, with the filtering media being in both the first region and the second region; and
   an air ejection pipe configured to eject air,
   wherein a distance of a space between the support member and the lower end of the partition plate in the vertical direction in the filtering media packed layer is larger than a maximum dimension of the filtering media such that the filtering media is in the first and the second regions and is under the lower end of the partition plate in the space between the support member and the lower end of the partition plate, and when the treatment tank is full of washing liquid, the air ejection pipe ejects air to one of the first region and the second region.

9. A sewage treatment system comprising:
   a solid-liquid separating apparatus including a first filtering media packed layer configured to separate sewage to be treated into solid components and filtered water by passing the sewage through the first filtering media packed layer upward; and
   a trickling filter configured to treat the filtered water, the trickling filter comprising:

a treatment tank including a second filtering media packed layer packed with filtering media to which microorganisms are attached and a support member placed at the bottom of the second filtering media packed layer configured to support the filtering media;

a rotary trickling device configured to trickle the filtered water onto the second filtering media packed layer;

a partition plate, which has a lower end, positioned in a vertical direction of the second filtering media packed layer and configured to partition the second filtering media packed layer into a first region and a second region, with the filtering media being in both the first region and the second region; and an air ejection pipe configured to eject air to one of the first region and the second region, wherein a distance of a space between the support member and the lower end of the partition plate in the vertical direction in the second filtering media packed layer is larger than a maximum dimension of the filtering media such that the filtering media is in the first and the second regions and is under the lower end of the partition plate in the space between the support member and the lower end of the partition plate.

* * * * *